US008240270B2

(12) United States Patent
Naruishi

(10) Patent No.: US 8,240,270 B2
(45) Date of Patent: Aug. 14, 2012

(54) IMPACT DETECTING APPARATUS AND PACKAGE DEVICE

(75) Inventor: Moku Naruishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 290 days.

(21) Appl. No.: 12/461,797

(22) Filed: Aug. 25, 2009

(65) Prior Publication Data
US 2010/0050733 A1 Mar. 4, 2010

(30) Foreign Application Priority Data

Sep. 1, 2008 (JP) ................................. 2008-223828
Nov. 25, 2008 (JP) ................................. 2008-299992

(51) Int. Cl.
G01L 5/00 (2006.01)
G01N 3/30 (2006.01)

(52) U.S. Cl. ...... 116/203; 116/200; 73/12.06; 73/12.09; 73/12.13

(58) Field of Classification Search .................. 73/12.01, 73/12.05, 12.09, 12.06; 116/200, 202, 203, 116/204, 211, 212, 267, 276
See application file for complete search history.

(56) References Cited

U.S. PATENT DOCUMENTS

| 3,373,716 | A | * | 3/1968 | Williams | 116/203 |
| 3,623,449 | A | * | 11/1971 | Knutson | 116/203 |
| 3,688,734 | A | * | 9/1972 | Davis et al. | 116/215 |
| 3,707,722 | A | * | 12/1972 | Itoh | 346/7 |
| 3,835,809 | A | * | 9/1974 | Sinn, Jr. | 116/203 |
| 3,909,568 | A | * | 9/1975 | Greenhut | 200/61.45 R |
| 3,921,463 | A | * | 11/1975 | Robbins | 73/492 |
| 4,060,004 | A | * | 11/1977 | Scholz et al. | 340/436 |
| 4,068,613 | A | * | 1/1978 | Rubey | 116/203 |
| 4,125,085 | A | * | 11/1978 | Rubey | 116/203 |
| 4,177,751 | A | * | 12/1979 | Rubey | 116/201 |
| 4,237,736 | A | * | 12/1980 | Wright | 73/492 |
| 4,361,106 | A | * | 11/1982 | Eklof | 116/203 |
| 4,470,302 | A | * | 9/1984 | Carte | 73/492 |
| 6,367,408 | B1 | | 4/2002 | Gu | |
| 6,472,864 | B1 | | 10/2002 | Emo et al. | |
| 6,553,930 | B1 | * | 4/2003 | Johnston et al. | 116/212 |
| 6,712,274 | B2 | * | 3/2004 | Dvorkis et al. | 235/472.01 |
| 6,848,389 | B1 | * | 2/2005 | Elsasser et al. | 116/203 |
| 7,219,619 | B2 | * | 5/2007 | Fitzer et al. | 116/203 |

(Continued)

FOREIGN PATENT DOCUMENTS

DE 12 12 751 3/1966

(Continued)

OTHER PUBLICATIONS

"Drop Sign," Nippon Kako-Kizai Co., Ltd, JP Advertisement and English translation thereof (Publication date unknown).
Extended Search Report for European Application No. 09252075.8 dated Dec. 15, 2011.

Primary Examiner — Lisa Caputo
Assistant Examiner — Jonathan Dunlap
(74) Attorney, Agent, or Firm — Harness, Dickey & Pierce, P.L.C.

(57) ABSTRACT

An impact detecting apparatus that is configured to be attached to an object and includes a drop-impact display unit configured to display a direction of drop impact when the object is dropped; and a tilt display unit configured to display a direction of tilting when the object is tilted. The drop-impact display unit and the tilt display unit displays the direction of drop impact and the direction of tilting at the same time.

18 Claims, 22 Drawing Sheets

U.S. PATENT DOCUMENTS

| | | | |
|---|---|---|---|
| 7,469,595 B2 * | 12/2008 | Kessler et al. | 73/802 |
| 7,509,835 B2 * | 3/2009 | Beck | 73/12.01 |
| 2005/0217558 A1 * | 10/2005 | Fitzer et al. | 116/203 |
| 2007/0089480 A1 * | 4/2007 | Beck | 73/12.01 |
| 2009/0249858 A1 * | 10/2009 | Ishikawa et al. | 73/12.06 |
| 2010/0180457 A1 | 7/2010 | Katoh et al. | |

FOREIGN PATENT DOCUMENTS

| | | |
|---|---|---|
| EP | 2 164 086 | 3/2010 |
| GB | 733 594 | 7/1955 |
| JP | 2001-108703 | 4/2001 |
| JP | 2001-199475 | 7/2001 |

* cited by examiner

FIG. 4A
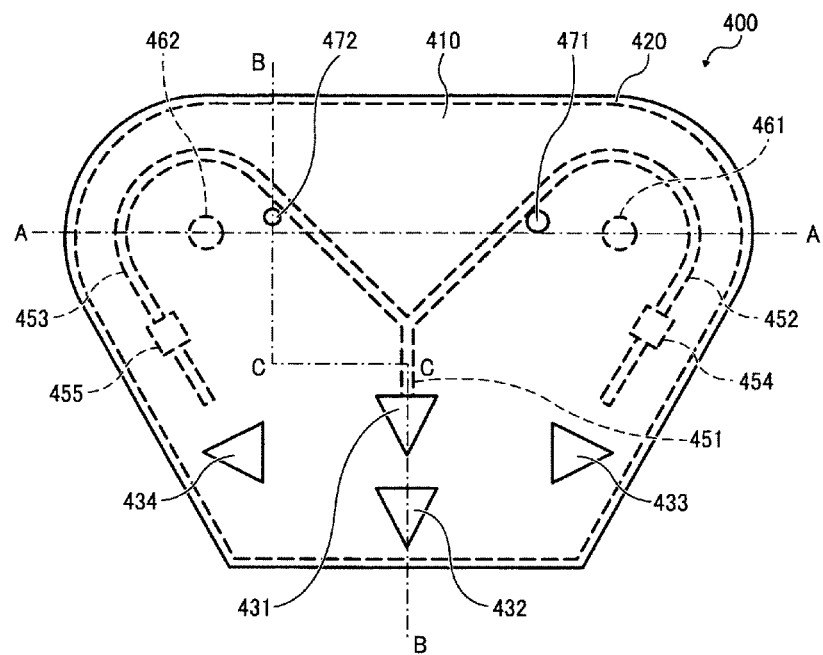
FIG. 4B
FIG. 4C
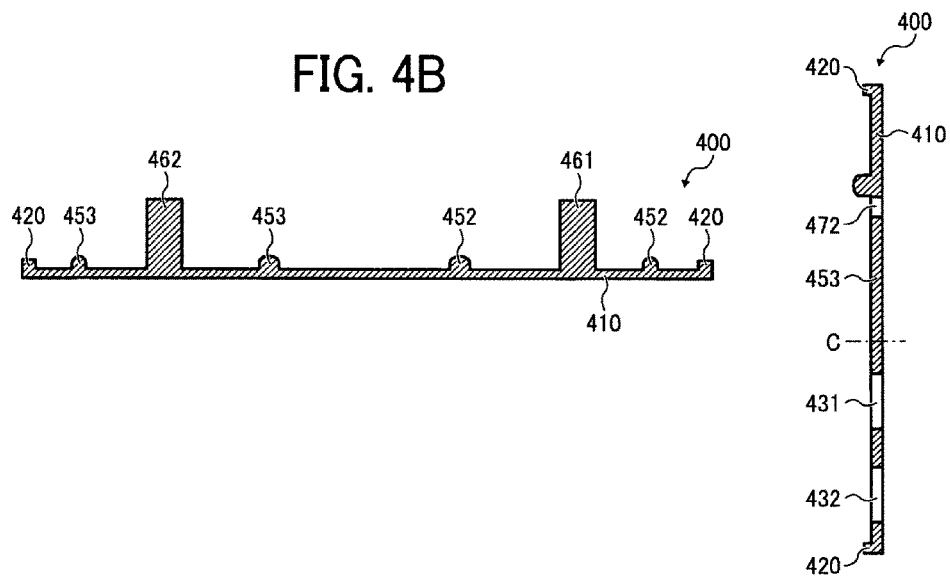

DEFAULT POSITION (UNDETECTED)

DROPPED (FIRST TIME)

TILTED TO RIGHT

DROPPED (SECOND TIME)

TILTED TO LEFT

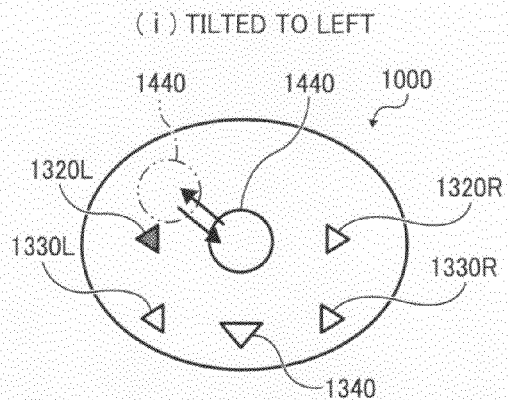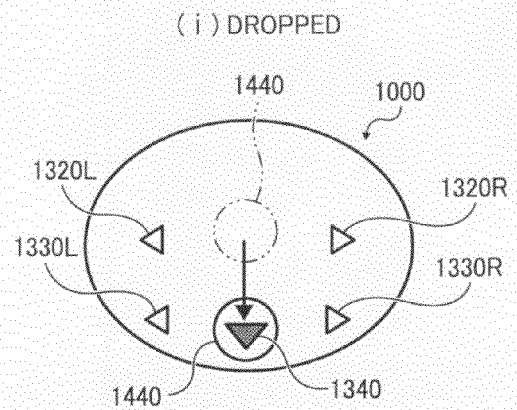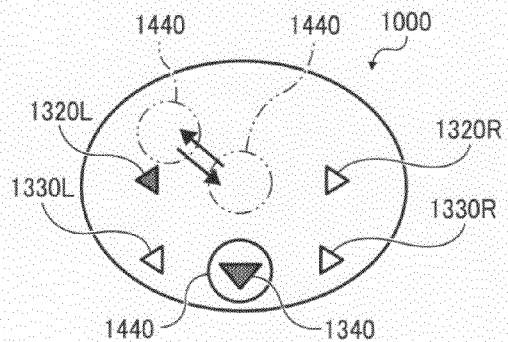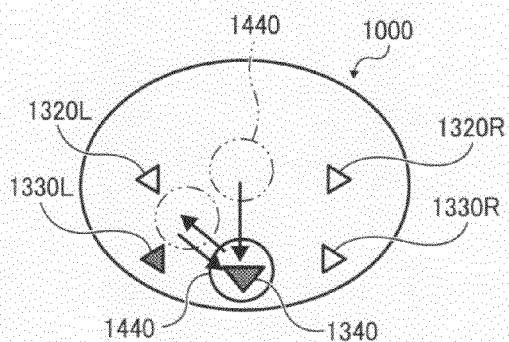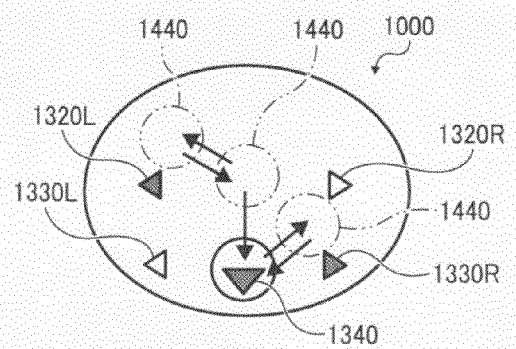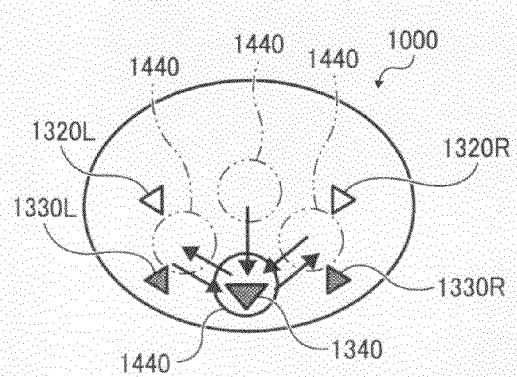

IMPACT DETECTING APPARATUS AND PACKAGE DEVICE

CROSS-REFERENCE TO RELATED APPLICATIONS

The present application claims priority to and incorporates by reference the entire contents of Japanese Patent Application No. 2008-223828 filed in Japan on Sep. 1, 2008 and Japanese Patent Application No. 2008-299992 filed in Japan on Nov. 25, 2008.

BACKGROUND OF THE INVENTION

1. Field of the Invention

The present invention relates to a technology for detecting whether an object has been subjected to drop impact or tilted.

2. Description of the Related Art

Goods including precision apparatuses are typically transported for long/short distances with various transportation media such as trucks, trains, ships. The goods may be damaged due to impact originating from inappropriate handling during the transport. Damage of the goods caused by impact of a predetermined level or smaller can be prevented by making a prior assessment on the goods accommodated in a package and taking a countermeasure against the damage based on a result of the assessment.

For example, Japanese Patent Application Laid-open No. 2001-108703 and Japanese Patent Application Laid-open No. 2001-199475 disclose conventional impact detecting apparatuses capable of detecting whether an object has been subjected to an impact. These conventional impact detecting apparatuses include a weight member having a flat surface to reflect an incoming light and a beam member that supports the weight member. The weight member is tilted upon receiving an impact. Therefore, by checking the current state of the weight member, it is possible to visually determine whether the object has been subjected to an impact during transportation.

Furthermore, NIPPON KAKO-KIZAI CO., LTD catalogue for "DROP SIGN" discloses another conventional impact detecting apparatus as shown in FIGS. 23A and 23B. The impact detecting apparatus includes a front case 1, a back case 2, leaf springs 3, a leaf-spring fixing member 4, guide plates 5, a weight 6, and window holes 7. When attached to an object in vertical posture, the impact detecting apparatus can detect impact that has been applied in the vertical direction. Specifically, in absence of an impact, the weight 6 is maintained by being sandwiched by the leaf springs 3 and an inner wall 8 in the center of a case formed of the front case 1 and the back case 2. However, when subjected to an impact, the weight 6 drops from the leaf springs 3. The weight 6 is colored so that when the weight 6 drops to a position corresponding to one of the window holes 7, a person can easily view the weight 6 through one of the window holes 7.

However, the impact detecting apparatuses disclosed in Japanese Patent Application Laid-open No. 2001-108703 and Japanese Patent Application Laid-open No. 2001-199457 have shortcomings. For example, they have a complicated structure, they cannot detect an impact both in a vertical direction and in a horizontal direction in a single event, and they detect only the first impact but cannot detect the second or later impacts.

On the other hand, in case of the impact detecting apparatus shown in FIG. 23A and FIG. 23B, the detection accuracy of an impact is unstable. More particularly, the impact detecting apparatus shown in FIG. 23B can be set to detect a plurality of detection levels. The same leaf springs 3 are shared for all the detection levels while the weight 6 having different mass is used depending on the detection levels. However, actual detection performance is not linked to the set detection levels as desired, so that the detection accuracy is often degraded. The reasons being that the lengths of the leaf springs 3 are relatively short with respect to the diameter of the weight 6. With such a configuration, a displacement amount "d" of the leaf springs 3 due to the movement of the weight 6 (see (3) of FIG. 23B) is relatively large, increasing a distance and time of contact between one of the leaf springs 3 and the weight 6. As a result, the leaf springs 3 are more likely to cause scoring on the weight 6. Furthermore, because the weight 6 is also supported by the inner wall 8, friction between the inner wall 8 and the weight 6 affects a dropping condition of the weight 6. Thus, even if the weight 6 and the leaf springs 3 are maintained in the same conditions, the same dropping condition cannot always be obtained.

Furthermore, in the impact detecting apparatus shown in FIGS. 23A and 23B, the weight 6 pushes the leaf springs 3 due to the force of an impact and drops by gravity, so that the weight 6 can drop only in a single direction. In other words, while an impact in the vertical direction can be detected, an impact in the horizontal direction cannot be detected. The impact in the horizontal direction is detectable if the impact detecting apparatus is mounted in horizontal posture. However, in this case, the impact in the vertical direction cannot be detected. Thus, to detect impact and tilt in both the vertical direction and in the horizontal direction in a single event, two impact detecting apparatuses need to be mounted on the object.

If the object (e.g., goods) receives an impact that is stronger than an expected level due to inappropriate handling or rough handling, it is difficult to completely prevent the goods from being damaged even with use of the above impact detecting apparatuses.

If a package accommodating the goods is remarkably damaged, damage of the goods may be detected through inspection before the goods is delivered to a customer or a shop. However, if the package is not damaged but only the goods in the package is damaged, the damage of the goods could be detected only after the goods is delivered to the customer or the shop, which leads to customer's complaint or reduction of customer's trust.

SUMMARY OF THE INVENTION

It is an object of the present invention to at least partially solve the problems in the conventional technology.

According to an aspect of the present invention, there is provided an impact detecting apparatus configured to be attached to an object. The impact detecting apparatus includes a drop-impact display unit configured to display a direction of drop impact when the object is dropped; and a tilt display unit configured to display a direction of tilting when the object is tilted. The drop-impact display unit and the tilt display unit displays the direction of drop impact and the direction of tilting at the same time.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4A is a plan view of the front case shown in FIG. 1 as viewed from outside;

FIG. 4B is an end view of the front case taken from a line A-A of FIG. 4A;

FIG. 4C is a cross-sectional view of the front case taken at a line B-C-C-B of FIG. 4A;

FIG. 22A is a schematic diagram for explaining an example in which results of dropping and tilting of the impact detecting apparatus are displayed when the impact detecting apparatus drops and tilts to the left and right according to the second embodiment;

FIG. 22B is a schematic diagram for explaining another example in which results of dropping and tilting of the impact detecting apparatus are displayed when the impact detecting apparatus drops and tilts to the left and right according to the second embodiment.

DETAILED DESCRIPTION OF THE PREFERRED EMBODIMENTS

Exemplary embodiments of the present invention are explained in detail below with reference to the accompanying drawings.

Figure 1:
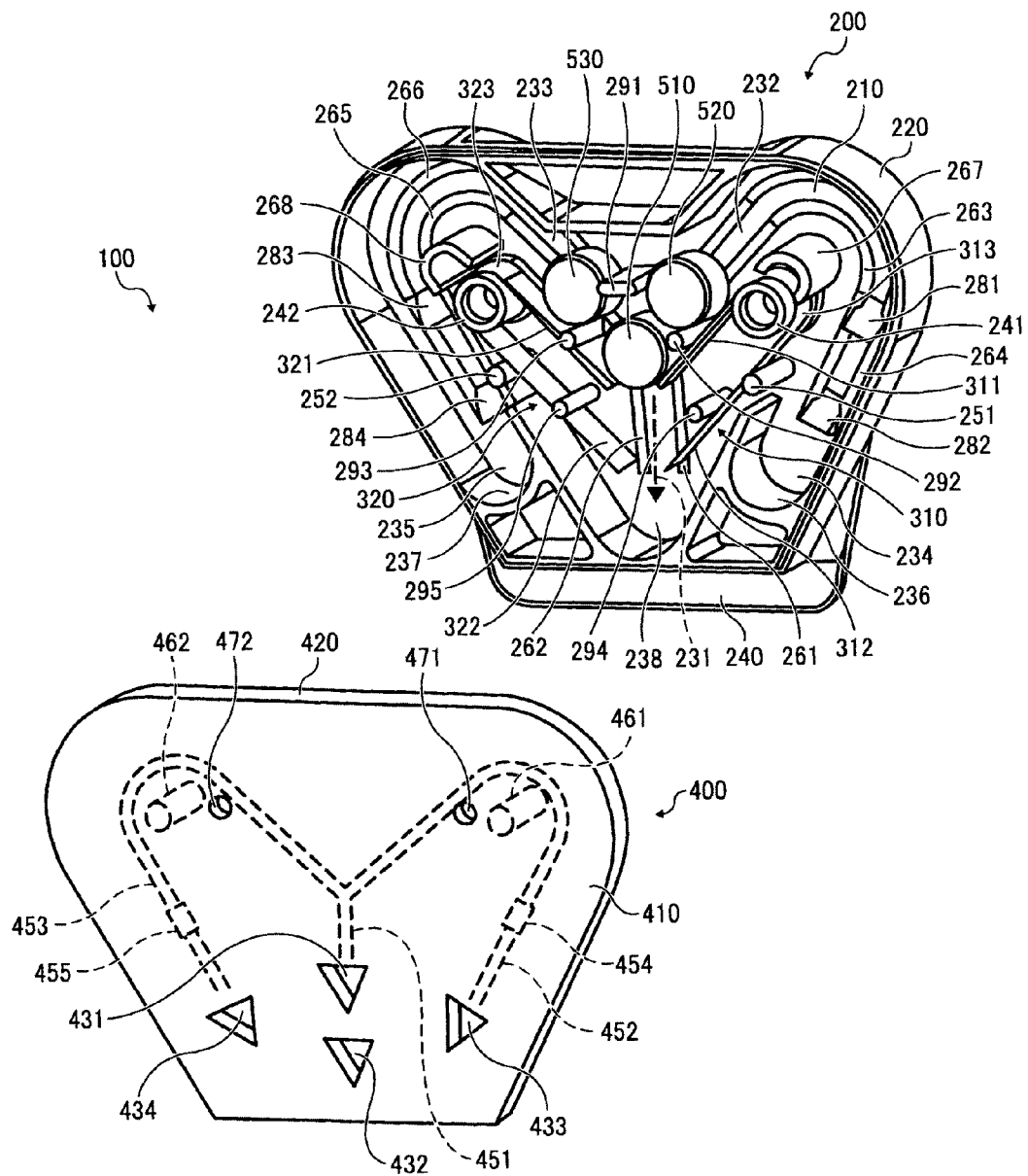
FIG. 1 is a perspective view of an impact detecting apparatus according to a first embodiment of the present invention in a state where a front case and a back case of the impact detecting apparatus are detached from each other.
Figure 2:
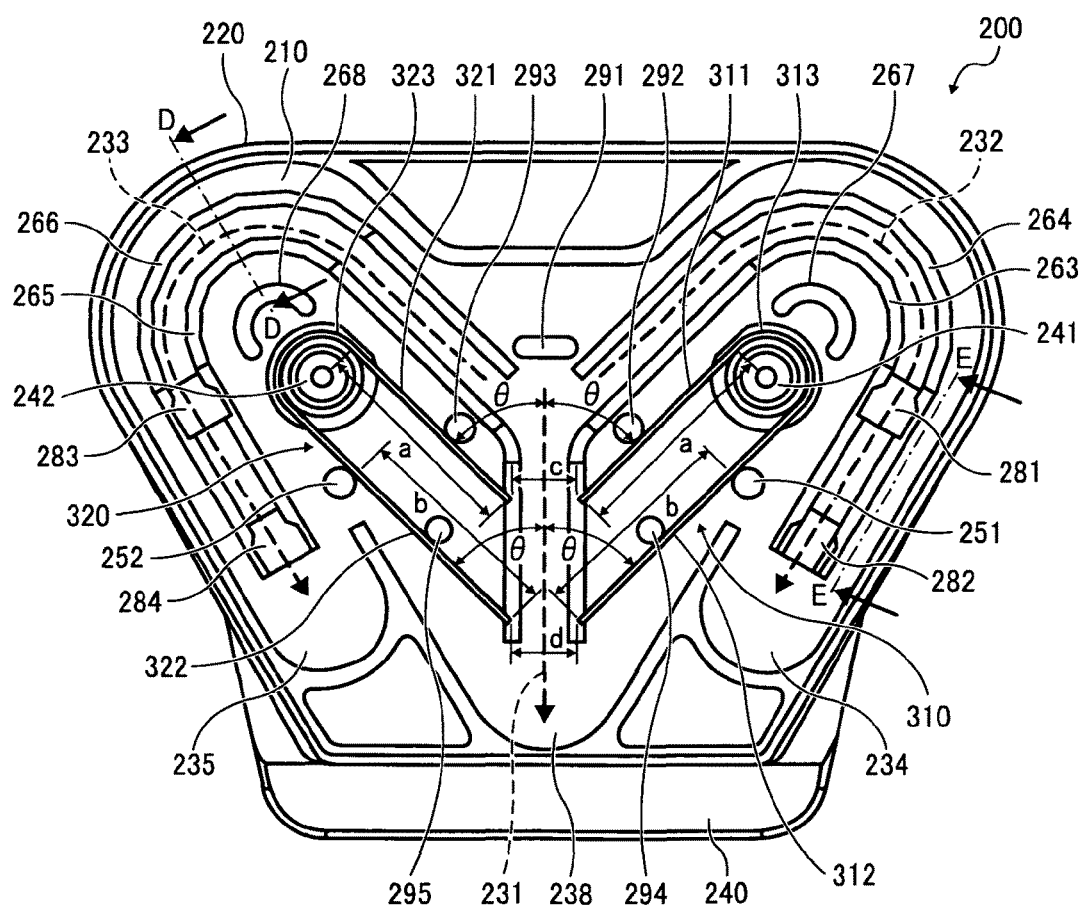
FIG. 2 is a plan view of an internal structure of the back case shown in FIG. 1.
Figure 3:
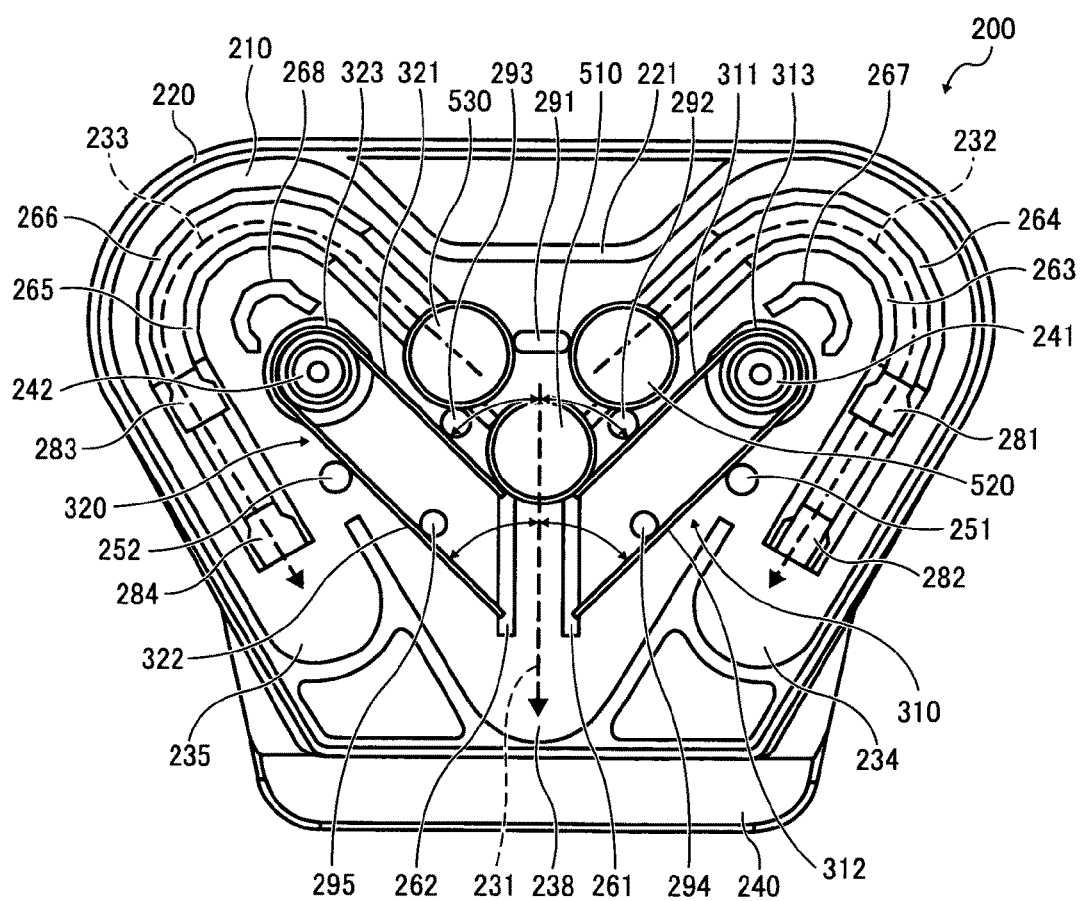
FIG. 3 is a plan view of the back case shown in FIG. 1 on which weights are mounted.

An impact detecting apparatus 100 according to a first embodiment of the present invention is described in detail below with reference to accompanying drawings. FIG. 1 is an exploded perspective view of the impact detecting apparatus 100 with a front case 400 and a back case 200 detached from each other. FIG. 2 is a plan view of the back case 200. FIG. 3 is a plan view of the back case 200 on which a first weight 510, a second weight 520, and a third weight 530 are mounted. FIG. 4A is a plan view of the front case 400. FIG. 4B is an end view of the front case 400 taken from a line A-A of FIG. 4A. FIG. 4C is a cross-sectional view of the front case 400 taken at a line B-C-C-B of FIG. 4A.

The impact detecting apparatus 100 accommodates three weights, that is, the first weight 510, the second weight 520, and the third weight 530, in a case formed with the back case 200 and the front case 400. The front case 400 is toward a viewer. In the impact detecting apparatus 100, movement of the first weight 510 implies a drop impact in a vertical direction, movement of the second weight 520 implies tilting to the right, i.e., one tilt direction, movement of the third weight 530 implies tilting to the left, i.e., the other tilt direction. The movements of the first weight 510, the second weight 520, and the third weight 530 can be visually checked. Thus, the impact detecting apparatus 100 displays signs that a package device mounted with the impact detecting apparatus 100, for example, a cardboard case accommodating an image forming apparatus, was dropped or tilted.

In the first embodiment, the first weight 510 is supported by a right-side plate member 310 and a left-side plate member 320 and used for detecting drop impact twice. The right-side plate member 310 is formed of a first holding member 311 as an upper part thereof, a second holding member 312 as a lower part thereof, and a U-shaped member 313 formed into a substantial U-shape and with which the first holding member 311 and the second holding member 312 are connected to each other. Similarly, the left-side plate member 320 is formed of a first holding member 321 as an upper part thereof, a second holding member 322 as a lower part thereof, and a U-shaped member 323 formed into a substantial U-shape and with which the first holding member 321 and the second holding member 322 are connected to each other. Each of the right-side plate member 310 and the left-side plate member 320 is formed by bending a single elastic thin plate made of stainless steel.

The first weight 510 is supported on one side thereof by the first holding member 311 of the right-side plate member 310 and on the other side thereof by the first holding member 321 of the left-side plate member 320 in a default position in a vertical transfer path 231. When subjected to the first drop impact, the first weight 510 drops while pushing the first holding members 311 and 321, and is then supported by the second holding members 312 and 322. When subjected to the second drop impact, the first weight 510 drops while pushing the second holding members 312 and 322.

Tilting to the left or right is detected with rolling of the second weight 520 along the top surface of the first holding member 311 or rolling of the third weight 530 along the top surface of the first holding member 321.

Components of the impact detecting apparatus 100 are described in detail below. The back case 200 is made of synthetic resin and includes a bottom plate 210 and a protruded edge portion 220 protruded on a circumference of the bottom plate 210. The back case 200 also includes the vertical transfer path 231 in a vertical direction along which the first weight 510 moves due to the drop impact. The back case 200 also includes a curved right-side transfer path 232 along which the second weight 520 moves on the right of the vertical transfer path 231, and a curved left-side transfer path 233 along which the third weight 530 moves on the left of the vertical transfer path 231 (see FIG. 2).

A right-side weight holding portion 234 is formed on a downstream end of the right-side transfer path 232. A left-side weight holding portion 235 is formed on a downstream end of the left-side transfer path 233. A bottom weight holding portion 238 is formed on a downstream end of the vertical transfer path 231. The right-side weight holding portion 234 is formed of a rib member 236 protruded from the bottom plate 210. The left-side weight holding portion 235 is formed of a rib member 237 protruded from the bottom plate 210.

A right-side first supporting member 241 as a pillar bar member having a predetermined diameter and in which the U-shaped member 313 of the right-side plate member 310 is inserted to be supported is protruded from the bottom plate 210 on the right side of the vertical transfer path 231. Similarly, a left-side first supporting member 242 as a pillar bar member having a predetermined diameter and in which the U-shaped member 323 of the left-side plate member 320 is inserted to be supported is protruded from the bottom plate 210 on the left side of the vertical transfer path 231. An arc member 267 for fixing the right-side plate member 310 is protruded from the bottom plate 210 at a position above the right-side first supporting member 241. Similarly, an arc member 268 for fixing the left-side plate member 320 is protruded from the bottom plate 210 at a position above the left-side first supporting member 242. The arc members 267 and 268 function as guides on the inner sides of the right-side transfer path 232 and the left-side transfer path 233, respectively.

A right-side second supporting member 251 is protruded below the right-side first supporting member 241. A left-side second supporting member 252 is protruded below the left-side first supporting member 242. The right-side second supporting member 251 and the left-side second supporting member 252 are structured to have diameters smaller than those of the right-side first supporting member 241 and the left-side first supporting member 242, respectively. The right-side second supporting member 251 and the left-side second supporting member 252 function as stoppers for stopping rotation of the right-side plate member 310 and the left-side plate member 320, respectively. The right-side second supporting member 251 also functions as a fulcrum of the second holding member 312 on the lower side of the right-side plate member 310 when the second holding member 312 is elastically deformed. Similarly, the left-side second supporting member 252 also functions as a fulcrum of the second holding member 322 on the lower side of the left-side plate member 320 when the second holding member 322 is elastically deformed.

Vertical weight guide rails 261 and 262 are arranged on the bottom plate 210 along the vertical transfer path 231 and in contact with the first weight 510 so that the first weight 510 can smoothly move along the vertical transfer path 231. Similarly, right-side weight guide rails 263 and 264 are arranged on the bottom plate 210 along the right-side transfer path 232, and left-side weight guide rails 265 and 266 are arranged on the bottom plate 210 along the left-side transfer path 233. Each of a pair of the vertical weight guide rails 261 and 262, a pair of the right-side weight guide rails 263 and 264, and a pair of the left-side weight guide rails 265 and 266 is integrated with the bottom plate 210 and formed into a shape having an arc cross section on a side to be in contact with corresponding one of the first weight 510, the second weight 520, and the third weight 530 to reduce contact resistance.

Reverse-preventive protruded portions 281 and 282 for preventing the second weight 520 from moving in a reverse direction are formed between the right-side weight guide rails 263 and 264. Similarly, reverse-preventive protruded portions 283 and 284 for preventing the third weight 530 from moving in a reverse direction are formed between the left-side weight guide rails 265 and 266. On the bottom plate 210, the following protruded portions are formed. That is, a stopper plate 291 that prevents the first weight 510 from bouncing upward, a weight holding member 292 that supports a bottom portion of the second weight 520, a weight holding member 293 that supports a bottom portion of the third weight 530, a position regulating member 294 that regulates a position of the upper side of the second holding member 312, and a position regulating member 295 that regulates a position of the upper side of the second holding member 322 are formed on the bottom plate 210. A flat portion 221 is formed as a part of the protruded edge portion 220 above the stopper plate 291 such that the flat portion 221 is made closer to the stopper plate 291 to prevent the second weight 520 from bouncing upward and moving towards the right-side transfer path 232 and prevent the third weight 530 from bouncing upward and moving towards the left-side transfer path 233, when the drop impact is applied.

A flange portion 240 by which the impact detecting apparatus 100 can be mounted on an object, such as goods, is extended downward from the back case 200. More particularly, the flange portion 240 is formed at a position extended from the bottom plate 210. As described above, the back case 200 has an axis-symmetry with respect to the vertical transfer path 231.

The front case 400 is described in detail below. The front case 400 is made of synthetic resin and includes a plate member 410 that covers the entire front surface of the back case 200, a protruded portion 420 as a positioning member formed on a circumference of the plate member 410, and four display windows used for checking the weights, i.e., a first display window 431 that displays a detection result of the first drop, a second display window 432 that displays a detection result of the second drop, a third display window 433 that displays a detection result of tilt to the right, and a fourth display window 434 that displays a detection result of tilt to the left. The first display window 431 is formed as an opening at a position where the first weight 510 is supported by the second holding members 312 and 322. The second display window 432, the third display window 433, and the fourth display window 434 are formed as openings at positions corresponding to the bottom weight holding portion 238, the right-side weight holding portion 234, and the left-side weight holding portion 235, respectively.

On the side of the plate member 410 opposite the back case 200, a vertical weight guide rail 451 corresponding to the vertical transfer path 231 is arranged in a line, a right-side weight guide rail 452 corresponding to the right-side transfer path 232 is arranged in a line, and a left-side weight guide rail 453 corresponding to the left-side transfer path 233 is arranged in a line. Each of the vertical weight guide rail 451, the right-side weight guide rail 452, and the left-side weight guide rail 453 is integrated with the plate member 410 and formed into a shape having an arc cross section on a side to be in contact with corresponding one of the first weight 510, the second weight 520, and the third weight 530 to reduce contact resistance. A reverse-preventive protruded portion 454 for preventing the second weight 520 from moving in a reverse direction is arranged on the right-side weight guide rail 452. Similarly, a reverse-preventive protruded portion 455 for preventing the third weight 530 from moving in a reverse direction is arranged on the left-side weight guide rail 453. The reverse-preventive protruded portion 454 is formed at a position between the reverse-preventive protruded portions 281 and 282. Similarly, the reverse-preventive protruded portion 455 is formed at a position between the reverse-preventive protruded portions 283 and 284.

A columnar pressing member 461 to be fitted in the arc member 267 formed on the bottom plate 210 and a columnar pressing member 462 to be fitted in the arc member 268 formed on the bottom plate 210 are formed on the plate member 410. When the front case 400 is put on the back case 200, the columnar pressing members 461 and 462 are inserted into the arc members 267 and 268, respectively, so that the right-side plate member 310 mounted on the right-side first supporting member 241 and the left-side plate member 320 mounted on the left-side first supporting member 242 are fixed at bottom positions in the center of the back case 200.

Two insertion holes 471 and 472 into which a weight fixing member 600 is inserted, which will be described later, are formed as openings on the plate member 410. More particularly, the insertion holes 471 and 472 are formed as openings at positions where the insertion holes 471 and 472 do not overlap with the right-side weight guide rail 452 and the left-side weight guide rail 453, respectively, and where the insertion holes 471 and 472 can effectively press the second weight 520 and the third weight 530, respectively.

The right-side plate member 310 and the left-side plate member 320 are described in detail below. In the first embodiment, the right-side plate member 310 is formed in such a manner that one thin plate material made of stainless steel having a uniform width (e.g., 6 meters) and a uniform thickness (e.g., 0.3 millimeters) is bent so that a bent portion functions as the U-shaped member 313, a portion on the upper side of the U-shaped member 313 functions as the first holding member 311, and a portion on the lower side of the U-shaped member 313 functions as the second holding member 312. Similarly, the left-side plate member 320 is formed in such a manner that one thin plate material made of stainless steel having a uniform width (e.g., 6 meters) and a uniform thickness (e.g., 0.3 millimeters) is bent so that a bent portion functions as the U-shaped member 323, a portion on the upper side of the U-shaped member 323 functions as the first holding member 321, and a portion on the lower side of the U-shaped member 323 functions as the second holding member 322. In the first embodiment, the U-shaped member 313 of the right-side plate member 310 is inserted into the right-side first supporting member 241, and the U-shaped member 323 of the left-side plate member 320 is inserted into the left-side first supporting member 242. Furthermore, the columnar pressing members 461 and 462 on the front case 400 are inserted into the arc members 267 and 268, respectively, so that the front case 400 can be fixed to the back case 200. In the first embodiment, the first holding member 311 (on the upper side) and the second holding member 312 (on the lower side) are integrated with each other, and the first holding member 321 (on the upper side) and the second holding member 322 (on the lower side) are integrated with each other, so that the impact detecting apparatus 100 can be downsized. If repulsion of each of the right-side plate member 310 and the left-side plate member 320 needs to be adjusted precisely, the right-side plate member 310 and the left-side plate member 320 can be made of phosphor bronze. Furthermore, if rust development of each of the right-side plate member 310 and the left-side plate member 320 needs to be assuredly prevented for a long-term storage, the right-side plate member 310 and the left-side plate member 320 can be made of resin (e.g., nylon).

In the state where the right-side plate member 310 and the left-side plate member 320 are mounted on the back case 200, as shown in FIG. 2, an effective length "a" of each of the first holding members 311 and 321 (on the upper side) corresponds to a length from a contact point between each of the first holding members 311 and 321 and corresponding one of the right-side first supporting member 241 and the left-side first supporting member 242 to an end of each of the first holding members 311 and 321. Similarly, an effective length "b" of each of the second holding members 312 and 322 (on the lower side) corresponds to a length from a contact point between each of the second holding members 312 and 322 and corresponding one of the right-side second supporting member 251 and the left-side second supporting member 252 to an end of each of the second holding members 312 and 322. The effective length "a" and the effective length "b" are set to be equal to each other (e.g., 20 millimeters). Furthermore, in the state where the right-side plate member 310 and the left-side plate member 320 are mounted on the back case 200, an interval length "c" between the first holding members 311 and 321 (on the upper side) is set to be equal to an interval length "d" between the second holding members 312 and 322 (on the lower side).

The first holding members 311, 321, and the second holding members 312, 322 are inclined at a predetermined angle θ (θ is equal to or smaller than 90 degrees, e.g., θ is 45 degrees) with respect to the vertical transfer path 231. As described above, the second holding members 312 and 322 function as lower guide members for guiding the second weight 520 and the third weight 530 to move along the right-side transfer path 232 and the left-side transfer path 233, respectively. Therefore, a detection angle employed for detecting the tilt can be changed by changing the angle θ. The angle θ affects the sensitivity of impact detection with the first weight 510, in addition to the setting of the detection angle. In the first embodiment, in consideration of the fact that a box-shaped package device is mainly used, the angle θ is set to 45 degrees.

The size and the accuracy of a drop-impact detection value depend on various parameters such as the angle θ, materials of the first holding members 311, 321 and the second holding members 312, 322, shapes of the cross sections of the first holding members 311, 321 and the second holding members 312, 322, the effective lengths "a" and "b", the interval lengths "c" between ends of the first holding members 311, 321, the interval lengths "d" between ends of the second holding members 312, 322, and mass and a diameter of each of the first weight 510, the second weight 520, and the third weight 530. In the first embodiment, these parameters are determined on assumption that a large package device is used. In general, regarding the large package device, the impact detecting apparatus is mainly used to detect dropping from a low position other than dropping from a high position. To detect drop impact as a result of dropping from the low position, it is necessary to extremely reduce spring force of the supporting members when the mass of the weights are small. Furthermore, to detect the drop impact due to dropping from the low position by using a light weight, it is necessary to use a supporting member with small spring force. In this case, however, detection accuracy of the drop impact decreases. The reason for this may be that friction or scoring between the weight and the supporting member largely affects the detection accuracy as an unstable element.

In view of the above facts, in the first embodiment, the weights having relatively large mass are used. More particularly, the weights made of stainless steel, having circular profiles with diameters of 10 millimeters and thicknesses of 6 millimeters, having mass of about 3.7 grams, and formed into tablet shapes are used. The weights are preferably chamfered to prevent friction or scoring. While the surfaces of the weights can be remained metallic colored, it is possible to paint a predetermined color or put a seal on end surfaces of the weights to increase visibility of the weights. If the weights are made of stainless steel, because stainless steel has relatively large specific gravity, the thicknesses or sizes of the weights can be reduced, resulting in downsizing the impact detecting apparatus. However, the weights can be made of other metal such as aluminum.

The specification of the right-side plate member 310 and the left-side plate member 320 (plate members), which are used for detecting the drop impact due to dropping from a position at a predetermined height with a predetermined weight, can be obtained through calculation. In other words, an amount of deflection of a leaf spring that is made of predetermined material and has a cross section in a predetermined shape is calculated according to deformation caused by impact energy due to dropping from a position at a predetermined height, and then, a necessary effective length of the leaf spring is obtained based on a calculation result. Based on the calculation result, dimensions of the first holding members 311, 321 and the second holding members 312, 322 are determined. If the effective length of the leaf spring is relatively short with respect to a diameter of the weight, the weight cannot be released from the leaf spring until the leaf spring is largely displaced. If the degree of the displacement of the leaf spring increases, a contact length and a contact time between the weight and an end portion of the leaf spring increase, so that the weight may not drop while being remained supported by the leaf spring due to scoring. Therefore, to assure the detection accuracy, the effective length of the leaf spring needs to be long enough with respect to the diameter of the weight.

Figure 5:
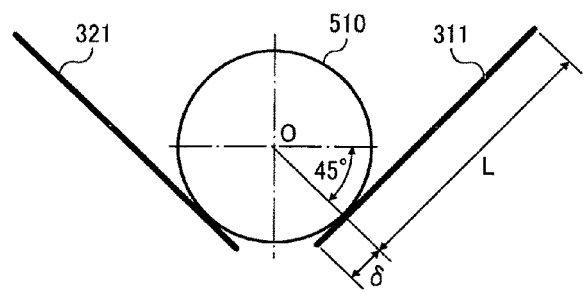
FIG. 5 is a schematic diagram for explaining a protrusion amount δ.
Figure 23A:
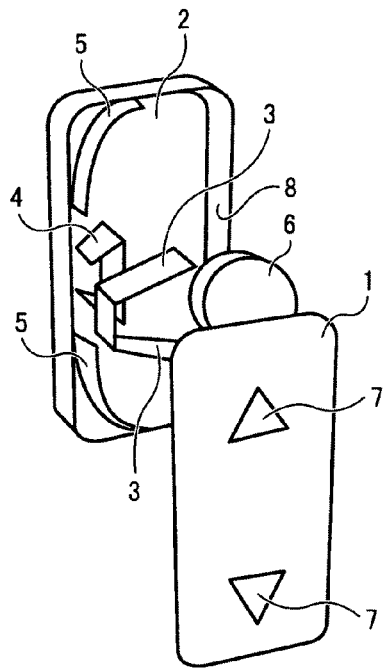
FIGS. 23A and 23B are schematic diagrams of a conventional impact detecting apparatus.
Figure 23B:
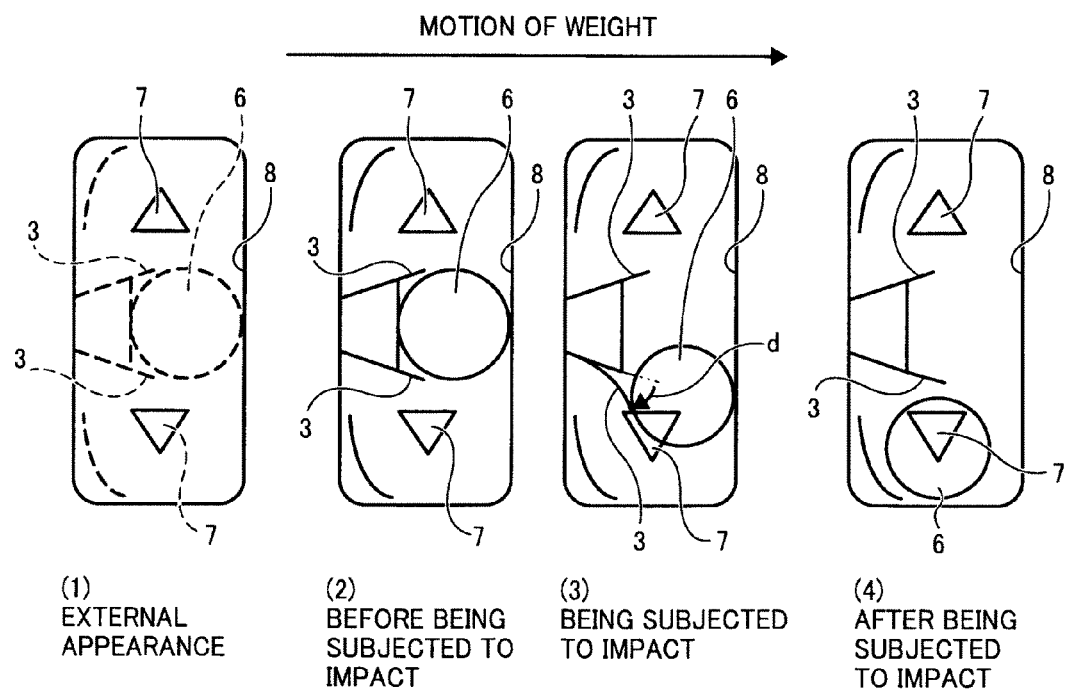

An amount δ of protrusion (hereinafter, "protrusion amount δ") from a contact point between each of the holding members and the weight is also used as the parameter for determining the drop-impact detection value. FIG. 5 is a schematic diagram for explaining the protrusion amount δ. In the example shown in FIG. 5, the first holding members 311 and 321 having the effective lengths "a" are inclined at 45 degrees to the first weight 510 in a symmetric manner. In this situation, a length from a contact point P between the first holding member 311 and the first weight 510 to an end of the first holding member 311 is regarded as the protrusion amount δ. It is assumed that, if the protrusion amount δ increases, a contact length and a contact time between the first weight 510 and the first holding member 311 increases, so that a drop height employed for detecting the drop impact increases. To examine this assumption, the inventors of this application made experiment in such a manner that the protrusion amount δ was changed with use of the first holding members 311 and 321 having the same effective lengths "L" and the first weight 510, and confirmed that the drop height employed for detecting the drop impact can be increased by increasing the protrusion amount δ. However, if the protrusion amount δ exceeds a predetermined threshold (e.g., 1 millimeter to 2 millimeters), there may be a case where the first weight 510 cannot drop and remained supported by the first holding members 311 and 321. Such a situation is regarded as one of causes of degradation of the detection accuracy in the conventional impact detecting apparatus (see FIG. 23B). Therefore, the protrusion amount δ needs to be set to equal to or smaller than the predetermined threshold. As described above, the sizes and the shapes of the first weight 510, the right-side plate member 310, and the left-side plate member 320 are determined based on various experiments.

Figure 6A:
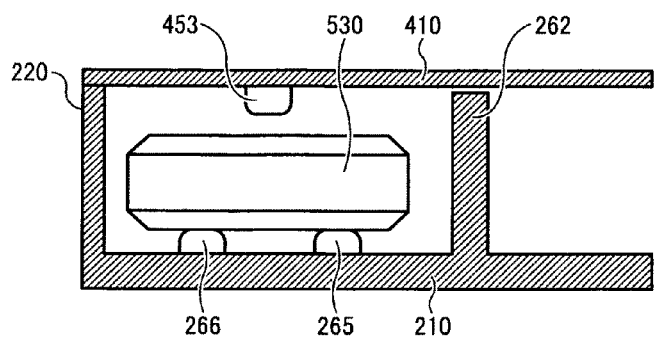
FIGS. 6A to 6C are cross-sectional schematic views of a protruded edge portion taken at a line D-D of FIG. 2 for explaining a contact state of a weight and weight guide rails.
Figure 6B:
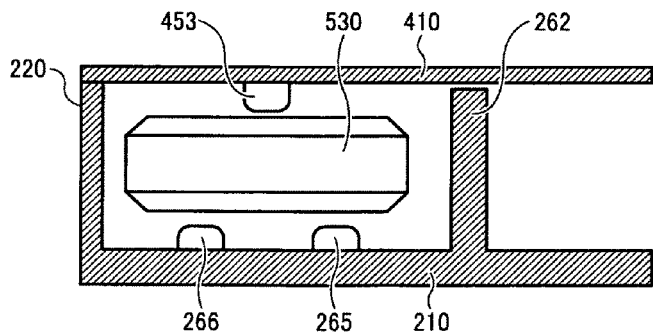
Figure 6C:
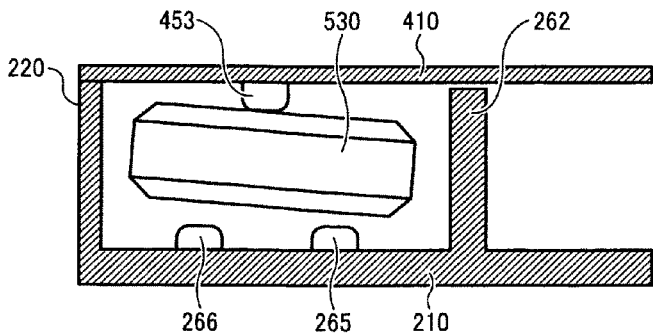

The above-described weight guide rails are described in detail below. FIGS. 6A to 6C are cross-sectional schematic views of the protruded edge portion 220 taken at a line D-D of FIG. 2 for explaining a contact state of the third weight 530 and the left-side weight guide rails 265 and 266. As described above, in the first embodiment, on the back case 200, the vertical weight guide rails 261 and 262 are formed along the vertical transfer path 231, the right-side weight guide rails 263 and 264 are formed along the right-side transfer path 232, and the left-side weight guide rails 265 and 266 are formed along the left-side transfer path 233. Furthermore, on the front case 400, the vertical weight guide rail 451 is formed along the vertical transfer path 231, the right-side weight guide rail 452 is formed along the right-side transfer path 232, and the left-side weight guide rail 453 is formed along the left-side transfer path 233. More particularly, regarding the left-side transfer path 233, the left-side weight guide rails 265 and 266 are formed on the bottom plate 210 and the left-side weight guide rail 453 is formed on the plate member 410. Therefore, as shown in FIGS. 6A to 6C, even when the third weight 530 moves to any positions or changes its posture, the third weight 530 can smoothly move without coming into contact with an inner wall surfaces or causing scoring.

Figure 7A:
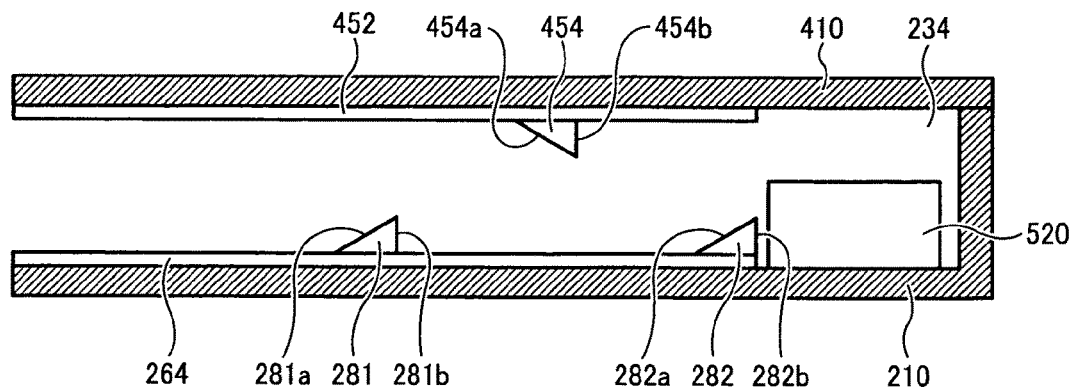
FIGS. 7A to 7C are cross-sectional schematic views of a right-side weight holding portion taken at a line E-E of FIG. 2 for explaining a mechanism for preventing a weight from moving in a reverse direction.
Figure 7B:
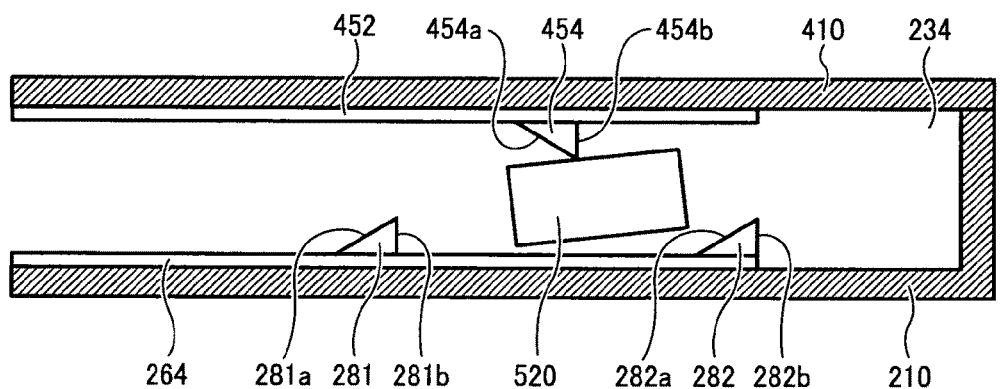
Figure 7C:
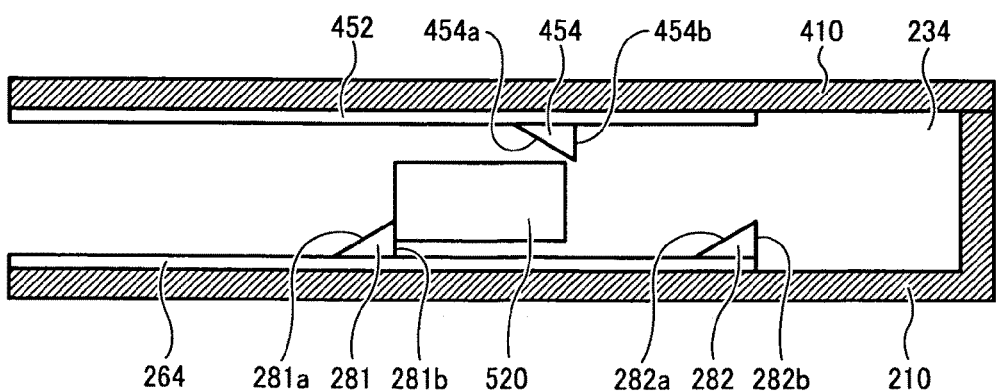

The reverse-preventive protruded portions 281, 282, 454, and 455 are described in detail below. FIGS. 7A to 7C are cross-sectional schematic views of the right-side weight holding portion 234 taken at a line E-E of FIG. 2 for explaining a mechanism for preventing a weight from moving in a reverse direction. As described above, in the right-side transfer path 232, the reverse-preventive protruded portions 281 and 282 are formed on the bottom plate 210 and the reverse-preventive protruded portion 454 is formed on the plate member 410. Similarly, in the left-side transfer path 233, the reverse-preventive protruded portions 283 and 284 are formed on the bottom plate 210 and the reverse-preventive protruded portion 455 is formed on the plate member 410. Detailed explanation about the reverse-preventive protruded portions 281, 282, and 455 in the right-side transfer path 232 is given below. The reverse-preventive protruded portions 281, 282, and 454 are formed of slope portions 281a, 282a, and 454a gradually rising along a moving direction of the second weight 520 and protruded sides 281b, 282b, and 454b protruded against a reverse moving direction of the second weight 520, respectively. The reverse-preventive protruded portions 283, 284, and 455 in the left-side transfer path 233 are also formed in the same manner. Therefore, as shown in FIGS. 7A to 7C, the second weight 520 fitted in the right-side weight holding portion 234 is prevented from moving in the reverse direction by the reverse-preventive protruded portions 281, 282, and 454. In the left-side weight holding portion 235, reverse move of the third weight 530 can be prevented in the same manner, so that fraudulent manipulation and the like can be prevented.

When the first weight 510 moves along the vertical transfer path 231, if the first weight 510 drops due to the first drop impact, reverse move of the first weight 510 is prevented by the first holding members 311 and 321. Then, if the first weight 510 drops due to the second drop impact, reverse move of the first weight 510 is prevented by the second holding members 312 and 322.

Operation of the impact detecting apparatus 100 is described in detail below. FIGS. 8A to 8E are schematic diagrams for explaining the operation of the impact detecting apparatus 100. In the default position, the first weight 510 is supported by the first holding members 311 and 321, the second weight 520 is supported by the stopper plate 291 and the weight holding member 292, and the third weight 530 is supported by the stopper plate 291 and the weight holding member 293. Therefore, each of the first weight 510, the second weight 520, and the third weight 530 is not viewed from a corresponding observation window (see FIG. 8A).

When subjected to the first dropping, the first weight 510 drops while pushing open the first holding members 311 and 321, and stops at the second holding members 312 and 322 at which the first weight 510 is supported. As a result, the first weight 510 can be viewed from the first display window 431 (see FIG. 8B).

Figure 8A:
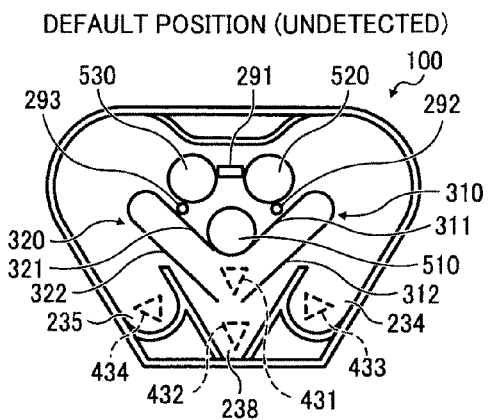
FIGS. 8A to 8E are schematic diagrams for explaining operation of the impact detecting apparatus shown in FIG. 1.
Figure 8B:
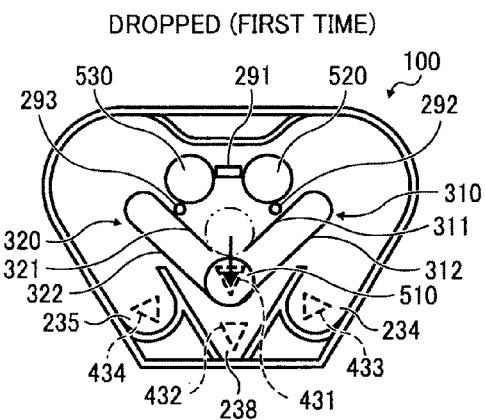

If the impact detecting apparatus 100 tilts to the right in the state shown in FIG. 8B, the second weight 520 is guided to roll along the first holding member 311 of the right-side plate member 310, so that the second weight 520 drops to the right-side weight holding portion 234 via the right-side transfer path 232. As a result, the second weight 520 can be viewed from the third display window 433 (see FIG. 8C).

Figure 8C:
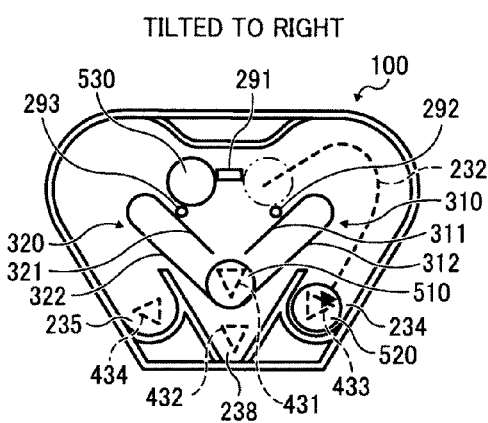

Furthermore, when subjected to the second dropping in the state shown in FIG. 8C, the first weight 510 drops while pushing open the second holding members 312 and 322, and stops at the bottom weight holding portion 238 at which the first weight 510 is supported. As a result, the first weight 510 can be viewed from the first display window 431 (see FIG. 8D).

Figure 8D:
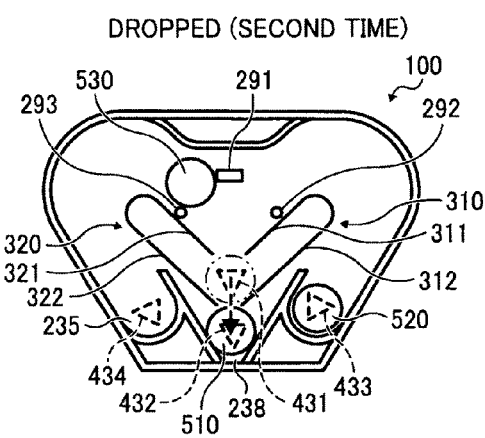
Figure 8E:
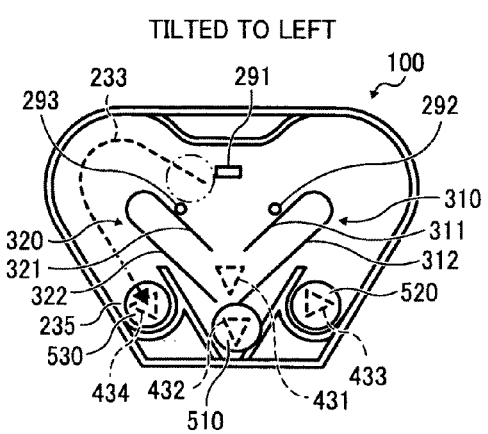

If the impact detecting apparatus 100 tilts to the left in the state shown in FIG. 8D, the third weight 530 is guided to roll along the first holding member 321 of the left-side plate member 320, so that the third weight 530 drops to the left-side weight holding portion 235 via the left-side transfer path 233 As a result, the third weight 530 can be viewed from the fourth display window 434 (see FIG. 8E).

In this manner, according to the first embodiment, each of the first weight 510, the second weight 520, and the third weight 530 can be viewed from corresponding one of the first display window 431, the second display window 432, the third display window 433, and the fourth display window 434 as a result of the first dropping, the second dropping, the tilt to the right, or the tilt to the left. Therefore, results about whether the impact detecting apparatus 100 has been subjected to the drop impact or tilted can be displayed with each of the first weight 510, the second weight 520, and the third weight 530 viewed from corresponding one of the first display window 431, the second display window 432, the third display window 433, and the fourth display window 434.

Figure 9A:
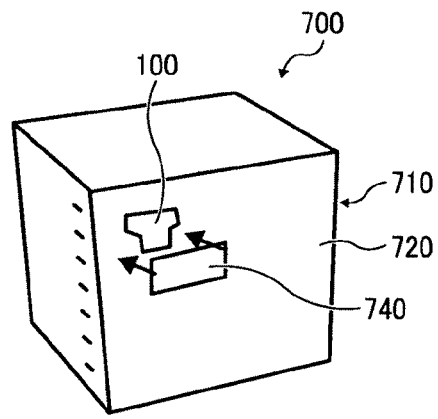
FIG. 9A is a schematic diagram of a package device on which the impact detecting apparatus shown in FIG. 1 is mounted.
Figure 9B:
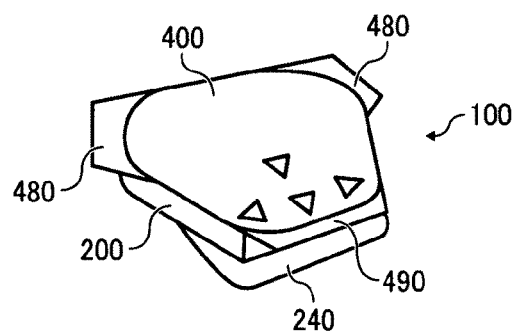
FIG. 9B is a perspective view of the impact detecting apparatus shown in FIG. 1 before being mounted on the package device shown in FIG. 9A.
Figure 9C:
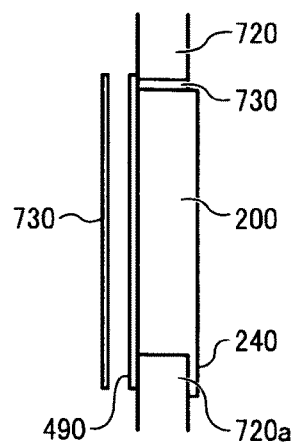
FIG. 9C is a side view of the package device and the impact detecting apparatus mounted on the package device.

A package device 700 according to the first embodiment is described in detail below. FIGS. 9A to 9C are schematic diagrams of the package device 700 on which the impact detecting apparatus 100 is mounted. More particularly, FIG. 9A is a perspective view of the package device 700 on which the impact detecting apparatus 100 is mounted. FIG. 9B is a perspective view of the impact detecting apparatus 100 before being mounted on the package device 700. FIG. 9C is a side view of the package device 700 and the impact detecting apparatus 100 mounted on the package device 700. In the first embodiment, the package device 700 is configured such that the impact detecting apparatus 100 is mounted on a side surface 720 of a cardboard box 710. The impact detecting apparatus 100 is fitted in an opening portion 730 formed on the side surface 720 of the cardboard box 710 so that the impact detecting apparatus 100 can be fixed at a position perpendicular to a vertical surface of an object.

To fit the impact detecting apparatus 100 in the side surface 720 of the cardboard box 710, as shown in FIG. 9B, it is preferable to form the flange portion 240 on the back case 200 of the impact detecting apparatus 100. Furthermore, it is preferable to form an extended portion 480 and a bottom protruded portion 490 on the front case 400 of the impact detecting apparatus 100. With this configuration, the bottom portion of the impact detecting apparatus 100 can be fitted in the opening portion 730 such that the flange portion 240 and the bottom protruded portion 490 sandwich a bottom edge portion 720a of the opening portion 730 while the extended portion 480 is brought into close contact with the surface of the side surface 720. At this state, if the impact detecting apparatus 100 is covered by a seal member 740, the impact detecting apparatus 100 can be assuredly mounted on the package device 700. Furthermore, it is possible to prevent a person from removing the impact detecting apparatus 100 for returning the first weight 510, the second weight 520, or the third weight 530 to the default position when the cardboard box 710 has been subjected to impact (i.e., fraudulent manipulation can be prevented). An adhesive face of the seal member 740 is preferably made of material part of which is to be attached to the cardboard box 710 when the seal member 740 is removed. Accordingly, it is possible to check whether the seal member 740 is removed because of the fraudulent manipulation.

Figure 10:
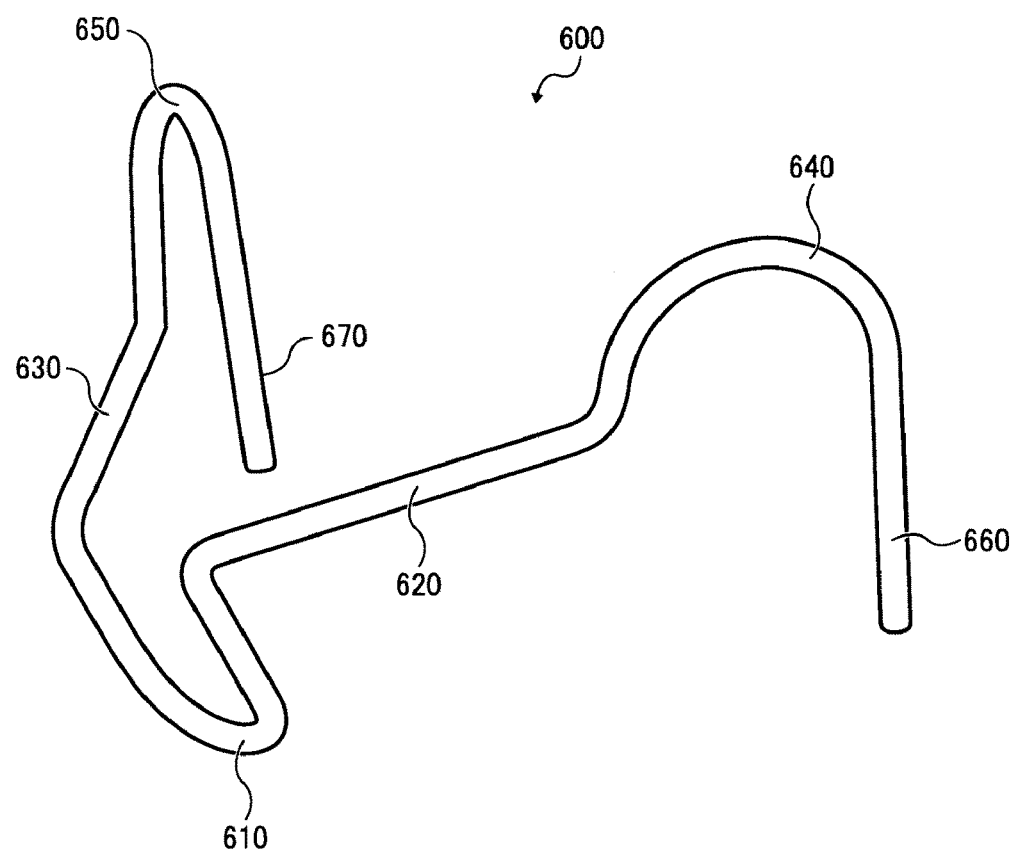
FIG. 10 is a schematic diagram of a weight fixing member according to the first embodiment.
Figure 11A:
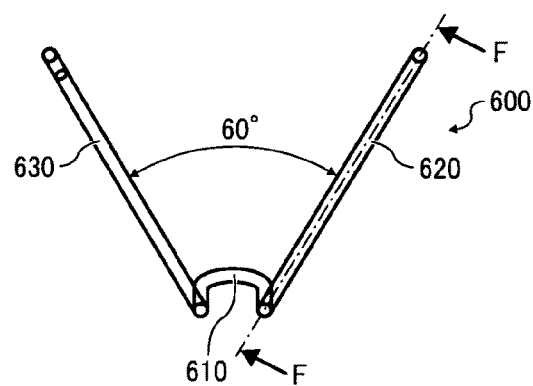
FIG. 11A is a plan view of the weight fixing member shown in FIG. 10.
Figure 11B:
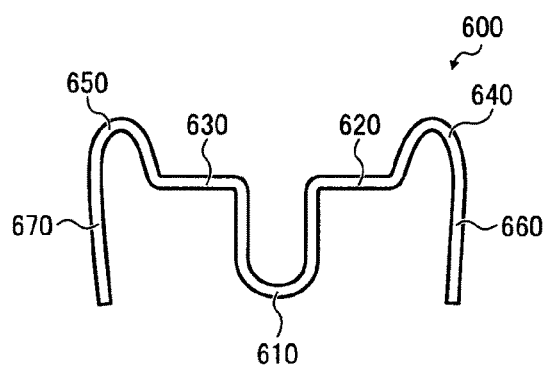
FIG. 11B is a front view of the weight fixing member shown in FIG. 10.
Figure 11C:
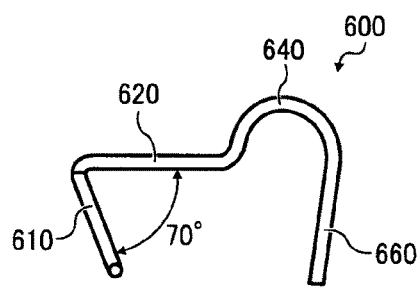
FIG. 11C is a side view of the weight fixing member shown in FIG. 10.

The impact detecting apparatus 100 can be provided with the weight fixing member 600 that fixes the first weight 510, the second weight 520, and the third weight 530 at the default positions during a period from manufacturing to shipping. FIG. 10 is a schematic diagram of the weight fixing member 600. FIG. 11A is a plan view of the weight fixing member 600. FIG. 11B is a front view of the weight fixing member 600. FIG. 11C is a side view of the weight fixing member 600.

Figure 11D:
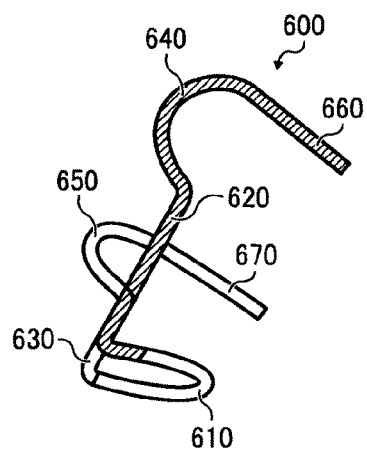
FIG. 11D is a cross-sectional view of the weight fixing member taken at a line F-F of FIG. 11A.
Figure 12A:
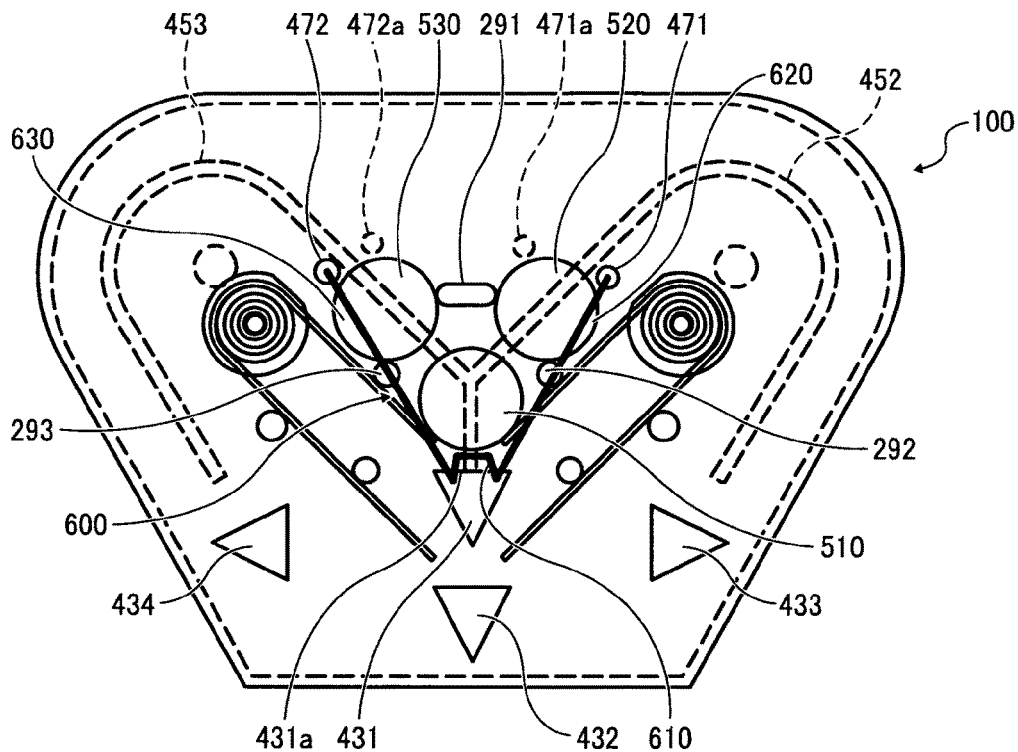
FIG. 12A is a plan view of the impact detecting apparatus on which the weight fixing member is mounted.
Figure 12B:
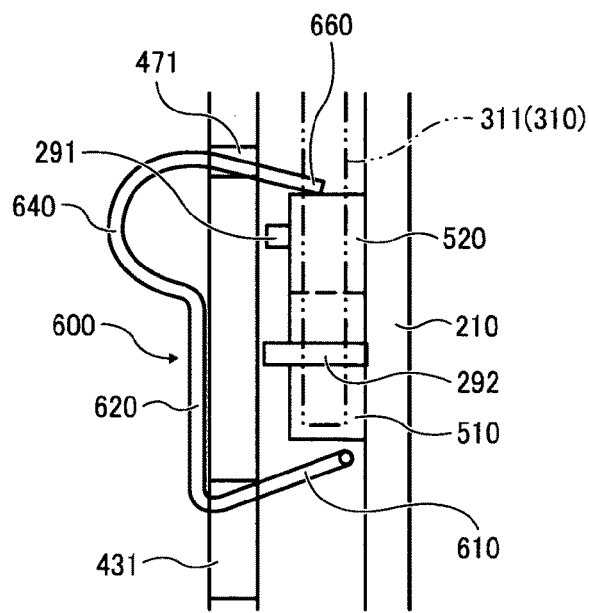
FIG. 12B is a schematic diagram for explaining a state where the weight is fixed.

FIG. 11D is a cross-sectional view of the weight fixing member 600 taken at a line F-F of FIG. 11A. FIG. 12A is a plan view of the impact detecting apparatus 100 on which the weight fixing member 600 is mounted. FIG. 12B is a schematic diagram for explaining a state where the second weight 520 is fixed.

The weight fixing member 600 is formed by bending a single metallic wire material. The weight fixing member 600 is formed of an insertion portion 610, two extended portions 620 and 630, knob portions 640 and 650, and two weight fixing leg portions 660 and 670. The insertion portion 610 is formed into a substantially U-shaped so that the insertion portion 610 can be inserted in the first display window 431. The extended portions 620 and 630 are bent at about 70 degrees from both ends of the first display window 431, respectively, and extended so that they can be brought into contact with the surface of the plate member 410 while maintaining an angle of about 60 degrees between the extended portions 620 and 630 when the weight fixing member 600 is mounted on the front case 400. The knob portions 640 and 650 are curved from the end portions of the extended portions 620 and 630, respectively, and are protruded in substantially semispherical shapes from the plate member 410 so that a person who mounts the weight fixing member 600 can hold the knob portions 640 and 650. The weight fixing leg portions 660 and 670 are formed as protruded portions from the knob portions 640 and 650, respectively, so that the weight fixing leg portions 660 and 670 can be inserted in the insertion holes 471 and 472 of the front case 400 to support the second weight 520 and the third weight 530, respectively. When the weight fixing member 600 is viewed from the side thereof, as shown in FIG. 11C, the insertion portion 610 and the weight fixing leg portion 660 are inclined inward.

To mount the weight fixing member 600 on the impact detecting apparatus 100, as shown in FIG. 12A, the insertion portion 610 is inserted in an upper edge portion 431a of the first display window 431, the weight fixing leg portions 660 and 670 are inserted in the insertion holes 471 and 472, respectively, and the extended portions 620 and 630 are brought into contact with the surface of the plate member 410. At this time, a person can assuredly mount the weight fixing member 600 by holding the knob portions 640 and 650.

In the first embodiment, when the weight fixing member 600 is mounted on the impact detecting apparatus 100, as shown in FIG. 12B, the insertion portion 610 is placed below the first weight 510 without being in contact with the first weight 510. At this state, the first weight 510 is supported by the first holding members 311 and 321, and, if the first weight 510 drops while pushing open the first holding members 311 and 321 by being subjected to impact, the insertion portion 610 prevents the first weight 510 from further dropping.

Meanwhile, when the weight fixing member 600 is mounted on the impact detecting apparatus 100, the weight fixing leg portions 660 and 670 are brought into contact with circumferential surfaces of the second weight 520 and the third weight 530, respectively. Therefore, the second weight 520 is supported at its three contact points with the weight fixing leg portion 660 of the weight fixing member 600, the stopper plate 291, and the weight holding member 292. Similarly, the third weight 530 is supported at its three contact points with the weight fixing leg portion 670, the stopper plate 291, and the weight holding member 293.

The positions of the insertion holes 471 and 472 formed on the front case 400 need to be at positions that do not overlap with the right-side weight guide rail 452 and the left-side weight guide rail 453, respectively. Under such a condition, the second weight 520 can be brought into contact with the weight fixing leg portion 660 at either the insertion hole 471 (a solid line) in FIG. 12A or a hole 471a (a dashed lines) located across the right-side weight guide rail 452 from the insertion hole 471. Similarly, the third weight 530 can be brought into contact with the weight fixing leg portion 670 at either the insertion hole 472 (solid line) in FIG. 12A or a hole 472a (a dashed line) located across the left-side weight guide rail 453 from the insertion hole 472. However, if the weight fixing leg portions 660 and 670 are inserted in the holes 471a and 472a, respectively, the weight fixing leg portions 660 and 670 bias the second weight 520 and the third weight 530 downward with relatively large force, respectively. Accordingly, the second weight 520 and the third weight 530 push the first holding members 311 and 321 downward, so that the first weight 510 may drop easily. Therefore, the weight fixing leg portions 660 and 670 cannot support tightly the second weight 520 and the third weight 530, respectively. In the first embodiment, therefore, the insertion holes 471 and 472 are formed as openings at positions indicated by solid lines. With the insertion holes 471 and 472, even when the weight fixing leg portions 660 and 670 push the second weight 520 and the third weight 530 with relatively large force, respectively, the second weight 520 and the third weight 530 can hardly push the first holding members 311 and 321 downward, respectively. As a result, it is possible to prevent the first weight 510 form easily dropping. While, in the first embodiment, the impact detecting apparatus 100 is structured to detect the drop impact twice, the present invention is not limited to this example. For example, it is possible to additionally mount one or more right-side plate members and one or more left-side plate members below the right-side plate member 310 and the left-side plate member 320 on the impact detecting apparatus 100 so that the drop impact can be detected three or more times.

Figure 13A:
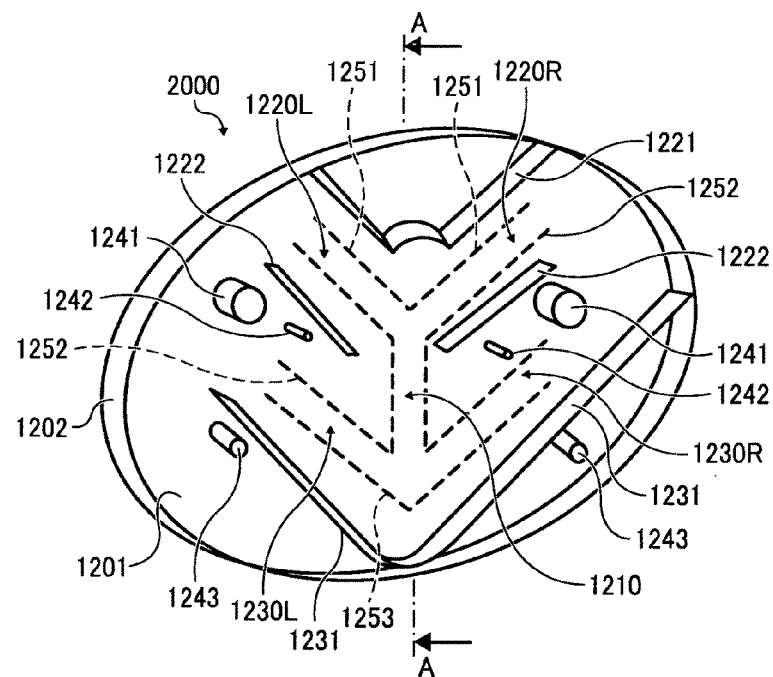
FIG. 13A is a perspective view of a back case of an impact detecting apparatus according to a second embodiment of the present invention.
Figure 13B:
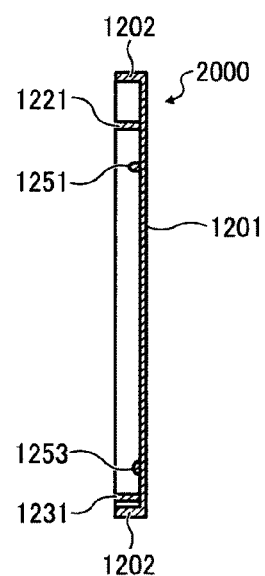
FIG. 13B is a cross-sectional view of the back case taken at a line A-A of FIG. 13A.
Figure 13C:
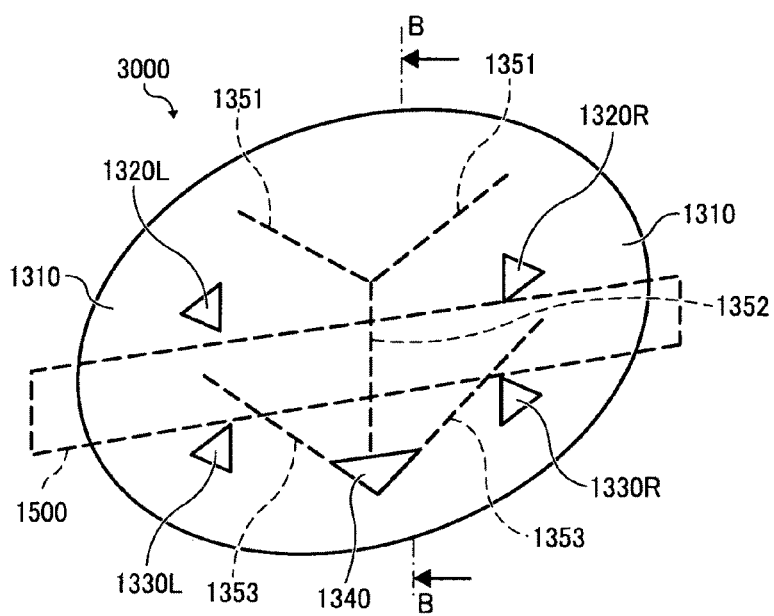
FIG. 13C is a perspective view of a front case of the impact detecting apparatus according to the second embodiment.
Figure 13D:
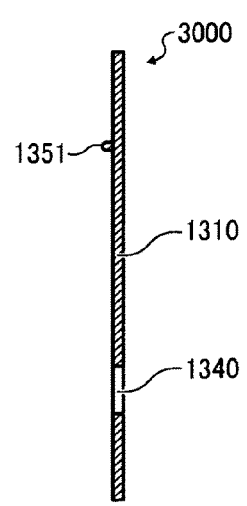
FIG. 13D is a cross-sectional view of the front case taken at a line B-B of FIG. 13C.
Figure 14A:
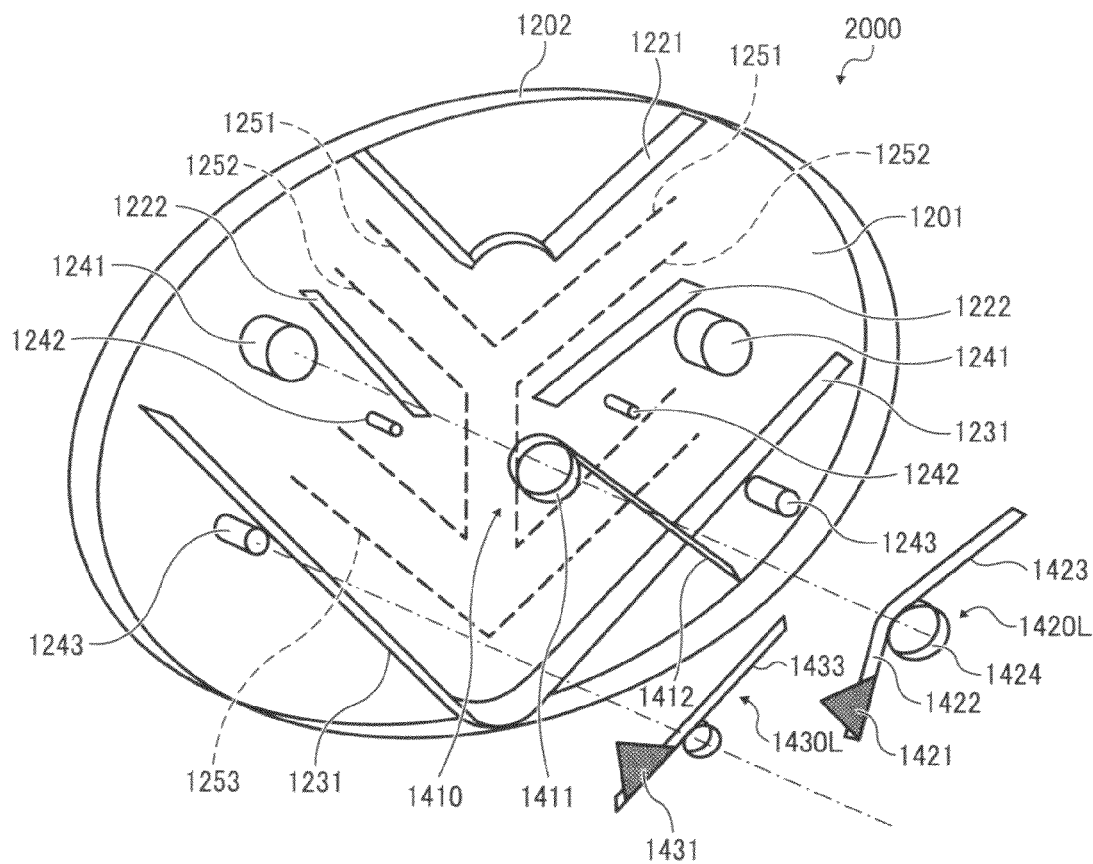
FIG. 14A is an exploded perspective view of the back case shown in FIG. 13A.
Figure 14B:
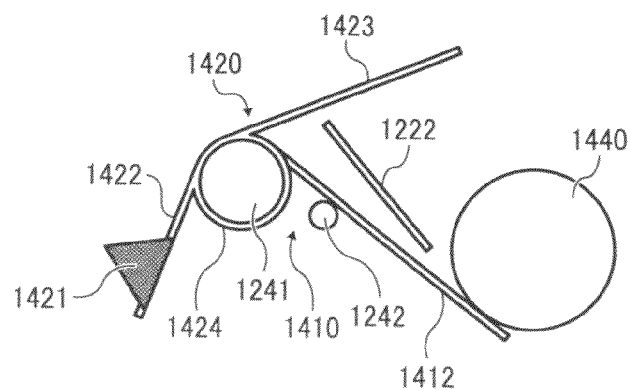
FIG. 14B is an enlarged front view of an arm member and a leaf spring for explaining a mount state thereof.
Figure 15:
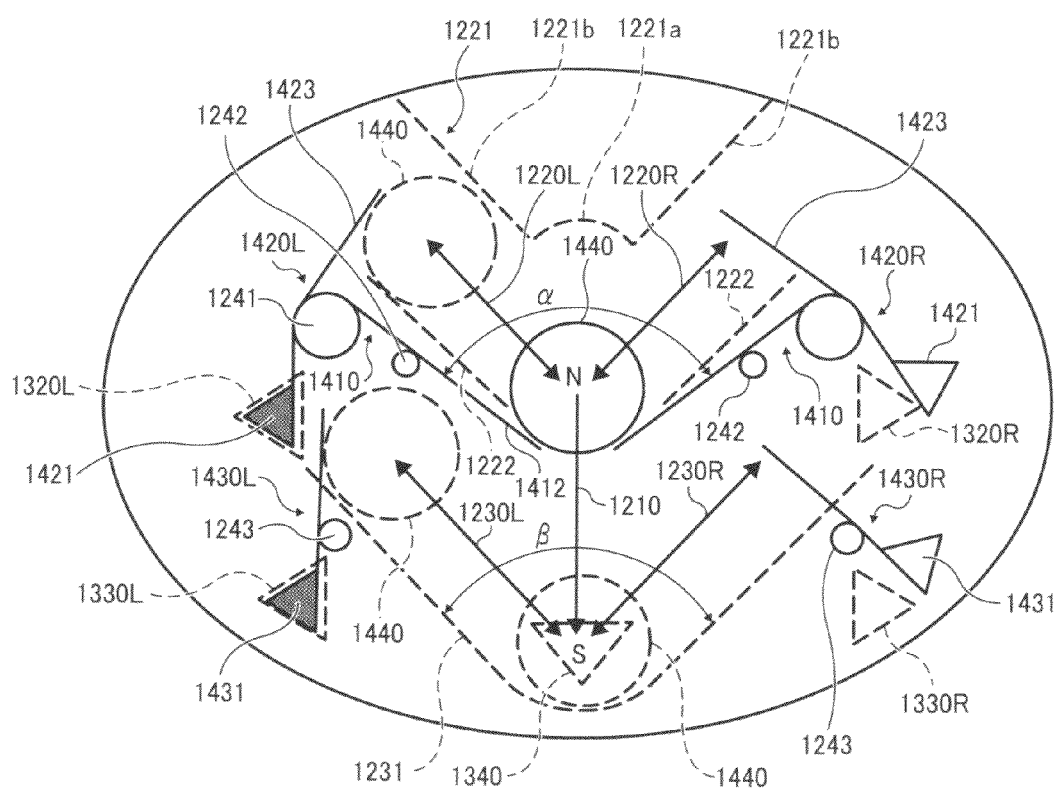
FIG. 15 is a schematic diagram for explaining operation of the impact detecting apparatus according to the second embodiment.

A configuration and operation of an impact detecting apparatus 1000 according to a second embodiment of the present invention are described in detail below with reference to the drawings. FIGS. 13A to 13D are schematic diagrams of the impact detecting apparatus 1000. More particularly, FIG. 13A is a perspective view of a back case 2000 of the impact detecting apparatus 1000. FIG. 13B is a cross-sectional view of the back case 2000 taken at a line A-A of FIG. 13A. FIG. 13C is a perspective view of a front case 3000 of the impact detecting apparatus 1000. FIG. 13D is a cross-sectional view of the front case 3000 taken at a line B-B of FIG. 13C. FIG. 14A is an exploded perspective view of the back case 2000. FIG. 14B is an enlarged front view of an arm member 1420 and one of leaf springs 1410 of the impact detecting apparatus 1000 for explaining a mount state of the arm member 1420 and the leaf spring 1410. FIG. 15 is a schematic diagram for explaining operation of the impact detecting apparatus 1000.

The impact detecting apparatus 1000 accommodates a weight 1440 in a case formed of the back case 2000 and the front case 3000 that covers a front side surface of the back case 2000. The impact detecting apparatus 1000 is configured to display results about whether an object on which the impact detecting apparatus 1000 is mounted, e.g., a cardboard case accommodating an image forming apparatus, has dropped or tilted and the weight 1440 has moved. In the second embodiment, the front case 3000 is mounted on the back case 2000 by being sealed with a label 1500.

In the impact detecting apparatus 1000, a vertical path 1210 is formed between a normal position N on the upper side and an impact detection position S on the lower side. The weight 1440 is placed on the vertical path 1210 such that the weight 1440 is supported by the two leaf springs 1410 at the normal position N in a normal state. When subjected to drop impact, the leaf springs 1410 are deformed by inertial force of the weight 1440, so that the weight 1440 is released from the leaf springs 1410 and drops from the normal position N on the upper side of the vertical path 1210 to the impact detection position S on the lower side of the vertical path 1210. In the impact detecting apparatus 1000, upper-side horizontal paths 1220L and 1220R (hereinafter, collectively referred to as "an upper-side horizontal path 1220" as appropriate) are formed on the left and on the right of the normal position N, respectively, such that each of the upper-side horizontal paths 1220L and 1220R is inclined upward from the normal position N of the vertical path 1210. Similarly, lower-side horizontal paths 1230L and 1230R (hereinafter, collectively referred to as "a lower-side horizontal path 1230" as appropriate) are formed on the left and on the right of the impact detection position S, respectively, such that each of the lower-side horizontal paths 1230L and 1230R is inclined upward from the impact detection position S. When the impact detecting apparatus 1000 tilts to the left or right, the weight 1440 moves from either the normal position N or the impact detection position S along any one of the upper-side horizontal paths 1220L, 1220R and the lower-side horizontal paths 1230L, 1230R.

The impact detecting apparatus 1000 includes a drop-impact display unit for displaying a position of the weight 1440 in the vertical path 1210. The impact detecting apparatus 1000 also includes tilt display units for displaying results of move of the weight 1440 in the upper-side horizontal paths 1220L, 1220R, and the lower-side horizontal paths 1230L, 1230R, respectively. More particularly, in the second embodiment, an impact display hole 1340 is formed as the drop-impact display unit on the front case 3000 so that the weight 1440 at the impact detection position S can be viewed from outside of the impact detecting apparatus 1000.

Furthermore, in the second embodiment, upper-side arm members 1420L and 1420R (hereinafter, collectively referred to as "the arm member 1420" as appropriate) for displaying results of move of the weight 1440 in the upper-side horizontal paths 1220L and 1220R, respectively, and lower-side arm members 1430L and 1430R (hereinafter, collectively referred to as "an arm member 1430" as appropriate) for displaying results of move of the weight 1440 in the lower-side horizontal paths 1230L and 1230R, respectively, are formed as the tilt display units. Each of the upper-side arm members 1420L, 1420R, and the lower-side arm members 1430L, 1430R is driven by being in contact with the weight 1440. Upper-side tilt display holes 1320L and 1320R (hereinafter, collectively referred to as "an upper-side tilt display hole 1320") from which display portions 1421 attached to the upper-side arm members 1420L and 1420R can be viewed, respectively, are formed as openings on the front case 3000. Similarly, lower-side tilt display holes 1330L and 1330R (hereinafter, collectively referred to as "a lower-side tilt display hole 1330") from which display portions 1431 attached to the lower-side arm members 1430L and 1430R can be viewed, respectively, are formed as openings on the front case 3000.

The configuration of the impact detecting apparatus 1000 is described in detail below. More particularly, the back case 2000 is described in detail below. The back case 2000 includes, as shown in FIGS. 13A to 13D, 14A, and 14B, a protruded portion 1202 formed on a circumference of an elliptical bottom plate member 1201. A top separation plate 1221 and a pair of middle separation plates 1222 are protruded from the bottom plate member 1201 such that the top separation plate 1221 and the pair of middle separation plates 1222 sandwich the upper-side horizontal paths 1220L and 1220R so that the upper-side horizontal paths 1220L and 1220R are formed by the top separation plate 1221 and the pair of the middle separation plates 1222. Furthermore, a separation plate 1231 is protruded from the bottom plate member 1201 at a position below the lower-side horizontal paths 1230L and 1230R such that the lower-side horizontal paths 1230L and 1230R are formed by the bottom separation plate 1231. Each of the top separation plate 1221, the pair of the middle separation plates 1222, and the bottom separation plate 1231 is formed in a bilaterally symmetric manner. The top separation plate 1221 is placed above the normal position N, and includes a curved portion 1221a that is curved upward in the center thereof. The top separation plate 1221 also includes inclined portions 1221b that are inclined upward from ends of the curved portion 1221a, respectively (see FIG. 15). With this configuration, when impact with strength that does not cause the weight 1440 to drop is applied in a vertical direction, and even if the weight 1440 pushes the leaf springs 1410 and then bounces upward, the weight 1440 hits the curved portion 1221a and thereby drops back to the normal position N. Therefore, it is possible to prevent the weight 1440 from moving to the upper-side horizontal path 1220L or the upper-side horizontal path 1220R, so that the upper-side arm member 1420L or the upper-side arm member 1420R is not driven. An angle α between the middle separation plates 1222 and an angle β between both sides of the bottom separation plate 1231 are set based on the detection angle employed for detecting the tilt. In the second embodiment, each of the angle α and the angle β is set to be equal to or smaller than 90 degrees.

Upper shaft portions 1241 that rotatably and pivotably support the upper-side arm members 1420L, 1420R and the leaf springs 1410, respectively, are formed on the bottom plate member 1201. Similarly, lower shaft portions 1243 that rotatably and pivotably support the lower-side arm members 1430L and 1430R, respectively, are formed on the bottom plate member 1201. Furthermore, support shaft portions 1242 that support bottom portions of the leaf springs 1410, respectively, are protruded from the bottom plate member 1201.

Moreover, on the bottom plate member 1201, weight guide rails 1251, 1252, and 1253 are formed along the vertical path 1210, the upper-side horizontal paths 1220L and 1220R, and the lower-side horizontal paths 1230L and 1230R, respectively. The weight guide rails 1251, 1252, and 1253 are arranged in a double-line manner along the vertical path 1210, the upper-side horizontal paths 1220L and 1220R, and the lower-side horizontal paths 1230L and 1230R. The back case 2000 is preferably made of synthetic resin such as acrylonitrile-butadiene styrene (ABS) plastic resin.

The front case 3000 is described in detail below. As shown in FIGS. 13A to 13D, an elliptical plate member 1310 having the same shape as that of the bottom plate member 1201 is arranged on the surface of the front case 3000 opposite the back case 2000.

The upper-side tilt display holes 1320L, 1320R, and the lower-side tilt display holes 1330L, 1330R are formed as openings on the elliptical plate member 1310. On the elliptical plate member 1310, a weight guide rail 1352 is formed along the vertical path 1210, a weight guide rail 1351 is formed along the upper-side horizontal paths 1220L and 1220R, and a weight guide rail 1353 is formed along the lower-side horizontal paths 1230L and 1230R. The weight guide rails 1351 to 1353 are arranged in a single-line manner along of the vertical path 1210, the upper-side horizontal paths 1220L and 1220R, and the lower-side horizontal paths 1230L and 1230R. More particularly, the weight guide rail 1351 is arranged between the weight guide rail 1251 and one of the weight guide rails 1252. The weight guide rail 1352 is arranged between the weight guide rails 1252. The weight guide rail 1353 is arranged between the other one of the weight guide rails 1252 and the weight guide rail 1253. The front case 3000 is preferably made of synthetic resin such as ABS plastic resin.

The leaf springs 1410 arranged on the back case 2000 are described in detail below. The leaf springs 1410 are arranged, as shown in FIGS. 14A, 14B, and 15, such that end portions of the leaf springs 1410 are brought closer to each other in bilaterally symmetric manner on the both sides of the normal position N in the vertical path 1210. The leaf springs 1410 support the weight 1440 at the normal position N in a normal state. When subjected to the drop impact, the weight 1440 pushes open the leaf springs 1410 by its inertial force, and then drops to the impact detection position S. In this state, even if the weight 1440 bounces upward by reaction, the leaf springs 1410 prevent the weight 1440 from moving further. The weight 1440 at the impact detection position S can be viewed from the impact display hole 1340, so that the fact that the impact detecting apparatus 1000 has been subjected to the drop impact can be notified. At this time, if a surface of the weight 1440 to be viewed from the impact display hole 1340 is colored, the weight 1440 can be viewed more easily.

Each of the leaf springs 1410 is formed of a covering portion 1411 that is inserted in and fixed at corresponding one of the upper shaft portions 1241 on the bottom plate member 1201, and a leaf spring portion 1412 that is extended from the covering portion 1411. The covering portion 1411 and the leaf spring portion 1412 are integrally formed by bending a single thin metallic plate. Each of the leaf spring portions 1412 is supported by the corresponding one of the support shaft portions 1242 formed on the bottom plate member 1201. The sensitivity of each of the leaf spring portions 1412 to the impact can be adjusted by changing a spring constant of corresponding one of the leaf springs 1410. When a cross section of each of the leaf spring portions 1412 is made uniform, a length from corresponding one of the support shaft portions 1242 to a contact point between the weight 1440 and each of the leaf spring portions 1412 can be adjusted.

It is preferable to set a mounting angle of each of the leaf spring portions 1412 to 90 degrees. However, the mounting angle can be adjusted as appropriate. Furthermore, each of the leaf spring portions 1412 is preferably made of stainless steel that is highly resistant to rusting during a long-term storage. If repulsion of each of the leaf spring portions 1412 needs to be adjusted precisely, the leaf spring portions 1412 can be made of phosphor bronze. If the leaf spring portions 1412 are made of resin (e.g., nylon), rust development can be prevented, which is preferable for the long-term storage.

Figure 16A:
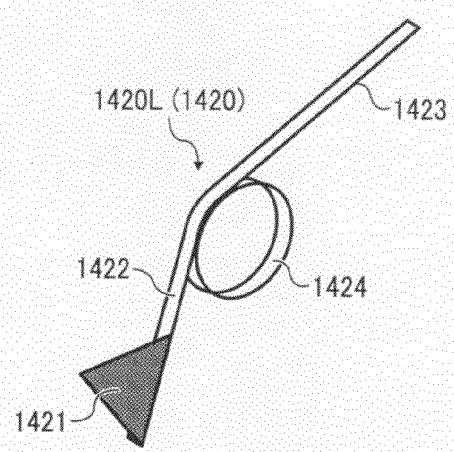
FIG. 16A is a perspective view of the arm member shown in FIG. 14B.
Figure 16B:
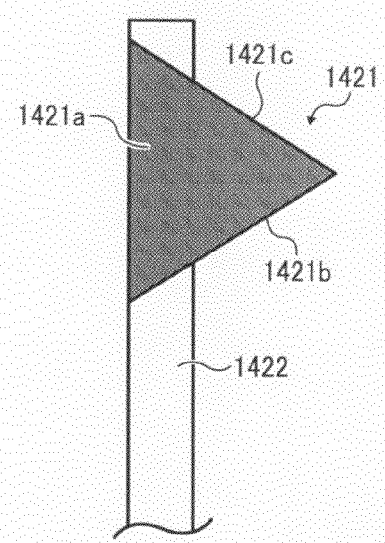
FIG. 16B is a partial enlarged plan view of the arm member shown in FIG. 14B.
Figure 16C:
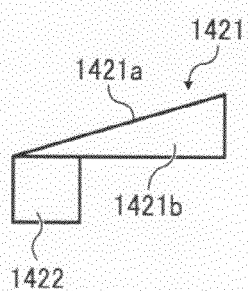
FIG. 16C is a partial enlarged front view of the arm member shown in FIG. 14B.
Figure 16D:
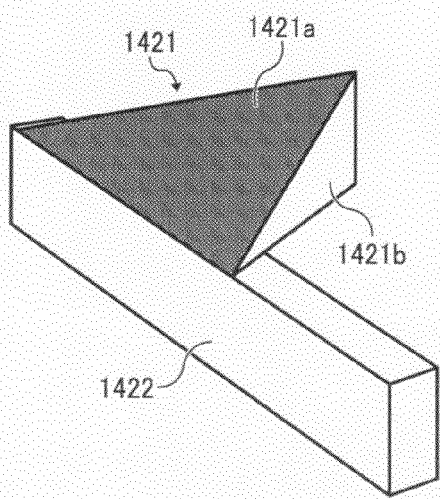
FIG. 16D is an enlarged perspective view of the arm member shown in FIG. 14B.
Figure 17A:
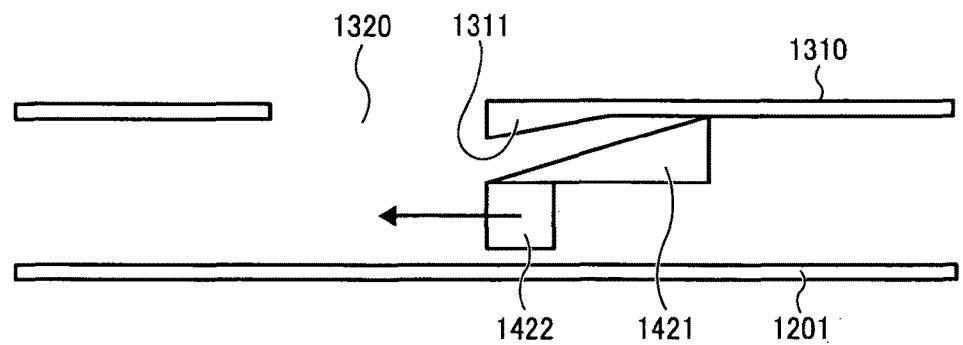
FIGS. 17A to 17C are schematic diagrams for explaining operational states of a display unit according to the second embodiment.
Figure 17B:
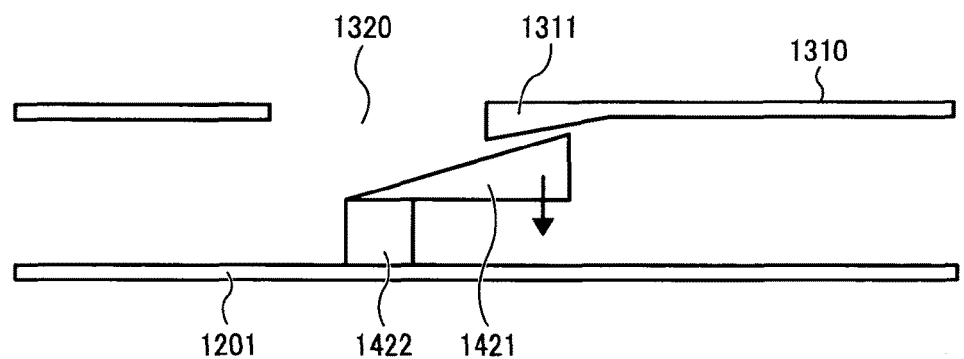
Figure 17C:
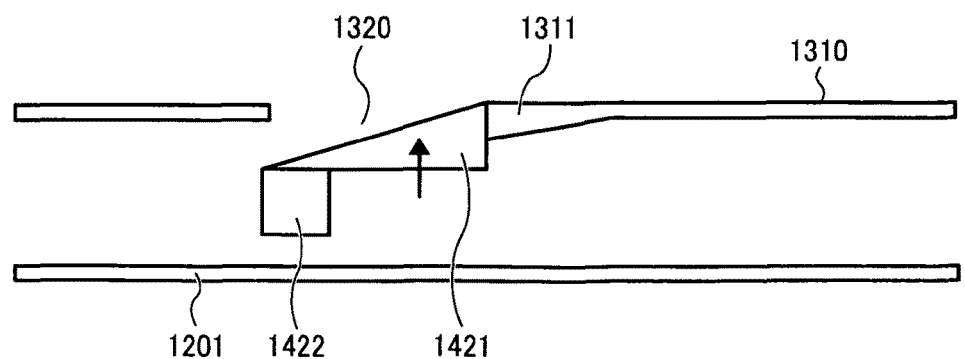
Figure 18:
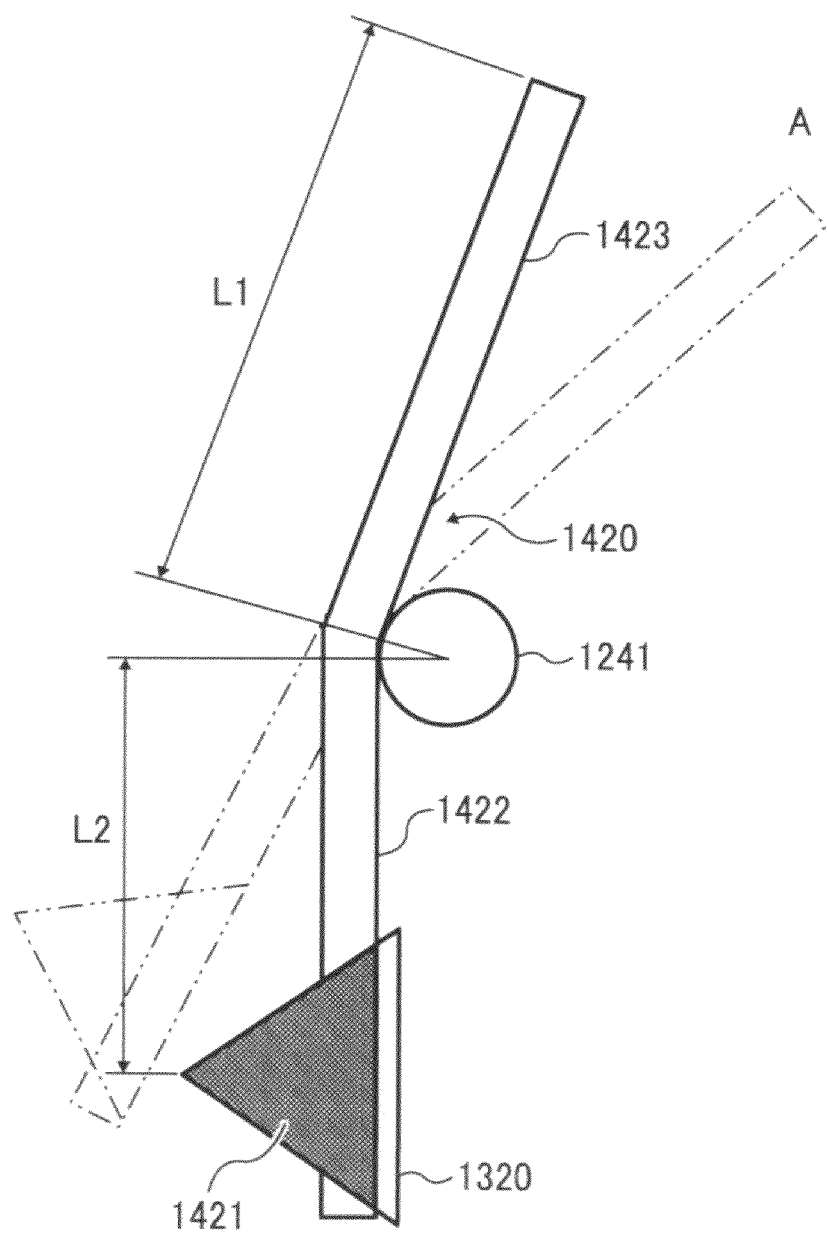
FIG. 18 is a schematic diagram for explaining a dimensional relation of portions of the arm member shown in FIG. 14B.

The arm members 1420 and 1430 are described in detail below. FIG. 16A is a perspective view of the upper-side arm member 1420L. FIG. 16B is a partial enlarged plan view of the upper-side arm member 1420L. FIG. 16C is a partial enlarged front view of the upper-side arm member 1420L. FIG. 16D is an enlarged perspective view of the upper-side arm member 1420L. FIGS. 17A to 17C are schematic diagrams of operational states of the display portion 1421 according to the second embodiment. FIG. 18 is a schematic diagram for explaining a dimensional relation of components of the arm member 1420. While the upper-side arm members 1420L and 1420R are bilaterally symmetric to each other, the configurations thereof are the same to each other. Furthermore, the configurations of the lower-side arm members 1430L and 1430R are the same as those of the upper-side arm members 1420L and 1420R. Therefore, only the configuration of the upper-side arm member 1420L is described in detail below. As shown in FIG. 16A, the upper-side arm member 1420L includes the display portion 1421 having a substantially triangular shape with colored surfaces, an arm portion 1422 on which the display portion 1421 is mounted, a contact portion 1423 that is extended from the arm portion 1422 and brought into contact with the weight 1440, and a covering portion 1424 that is mounted on a joint portion of the arm portion 1422 and the contact portion 1423 and to be rotatably fitted in the upper shaft portion 1241. Each of the arm portion 1422 and the contact portion 1423 is made of bar material having predetermined rigidity to prevent each of the arm portion 1422 and the contact portion 1423 from being bent when rotating while being in contact with the weight 1440. The leaf spring 1410 and the upper-side arm member 1420L are mounted on corresponding one of the upper shaft portions 1241 such that the leaf spring 1410 is on the rear side and the upper-side arm member 1420L is on the front side while the leaf spring 1410 and the upper-side arm member 1420L do not overlap with each other. The covering portion 1411 of the leaf spring 1410 and the covering portion 1424 of the upper-side arm member 1420L are placed in parallel in the front-back direction on one of the upper shaft portions 1241.

As shown in FIGS. 16B to 16D, the display portion 1421 is a wedge-shaped tetrahedral member formed of a colored front side surface 1421$a$, side surfaces 1421$b$, 1421$c$, and a bottom surface (not shown).

The display portion 1421 is structured to rotate, when the weight 1440 moves on one of the middle separation plates 1222 along the upper-side horizontal path 1220L from the normal position N due to the tilt to the left and thus comes into contact with the contact portion 1423, so that the front side surface 1421$a$ of the display portion 1421 is displayed in the upper-side tilt display hole 1320L.

In the second embodiment, as shown in FIGS. 17A to 17C, when the display portion 1421 is displayed in the upper-side tilt display hole 1320, the display portion 1421 is engaged with the upper-side tilt display hole 1320 to prevent the display portion 1421 from moving back to the default position. In other words, as shown in FIG. 17A, a slope portion 1311 is formed as a downward protruded portion on a part of a circumference of the upper-side tilt display hole 1320 that is formed as an opening on the elliptical plate member 1310. Therefore, when the display portion 1421 is rotated and moved along with move of the weight 1440, the display portion 1421 passes over the slope portion 1311 (see FIG. 17B). As a result, the display portion 1421 is placed and fitted inside the upper-side tilt display hole 1320. The display portion 1421 is caused to move in the front-back direction along with the move of the arm member 1420 because of elastic deformation of the arm portion 1422 between one of the upper shaft portions 1241 and the joint portion of the display portion 1421. The slope portion 1311 prevents the display portion 1421 of the arm member 1420 from being easily displayed in the upper-side tilt display hole 1320.

To cause the arm member 1420 to easily react against the contact with the weight 1440, a length L1 of the contact portion 1423 with which the weight 1440 comes into contact is preferably set to be longer than a distance L2 from one of the upper shaft portions 1241 to the display portion 1421 (L2<L1). A transparent member can be arranged on the upper-side tilt display hole 1320 to prevent the display portion 1421 from being moved from outside of the impact detecting apparatus 1000.

Figure 19A:
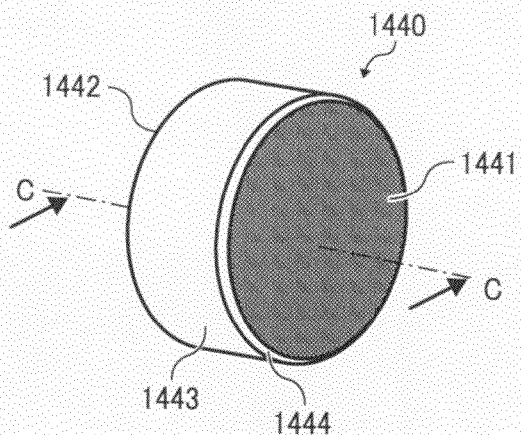
FIG. 19A is a perspective view of a weight according to the second embodiment.
Figure 19B:
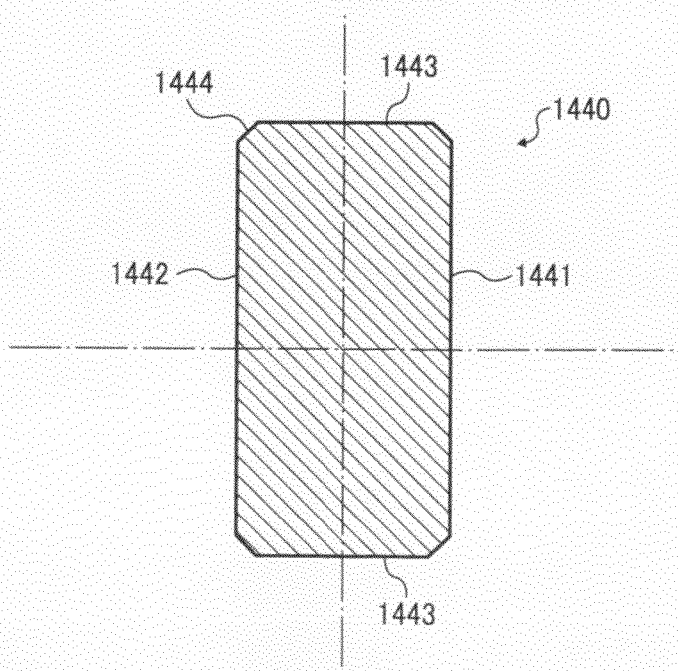
FIG. 19B is a cross-sectional view of the weight taken at a line C-C of FIG. 19A.

The weight 1440 is described in detail below. FIG. 19A is a perspective view of the weight 1440. FIG. 19B is a cross-sectional view of the weight 1440 taken at a line C-C of FIG. 19A. As shown in FIGS. 19A and 19B, the weight 1440 is in a tablet shape formed of two circular end surfaces 1441, 1442, and a cylindrical surface 1443. A chamfered portion 1444 is formed on the weight 1440 to reduce transfer resistance and prevent scoring with the back case 2000 and the front case 3000 when the impact detecting apparatus 1000 is subjected to the drop impact or tilted. To increase visibility of the weight 1440 viewed from the impact display hole 1340, it is preferable to color the end surfaces 1441 in a contrast color with respect to the color of the surface of the front case 3000 or put labels on the end surfaces 1441. By adjusting the mass of the weight 1440, the magnitude of the impact to be detected can be adjusted. The thickness of the weight 1440 can be reduced by forming the weight 1440 with metal having relatively large specific gravity, which makes it possible to downsize the impact detecting apparatus 1000. The weight 1440 can be made of other metal as appropriate. For example, the weight 1440 can be made of stainless steel or aluminum that has high rust resistance against a long-term storage of the weight 1440.

Figure 20A:
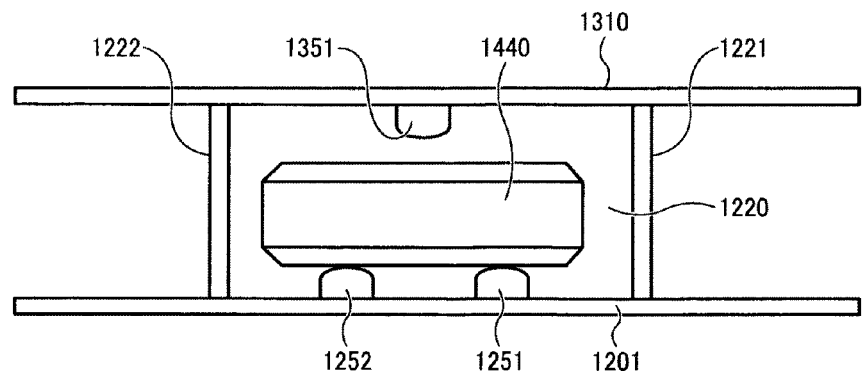
FIGS. 20A to 20C are schematic diagrams for explaining a contact state of a weight and weight guide rails according to the second embodiment.
Figure 20B:
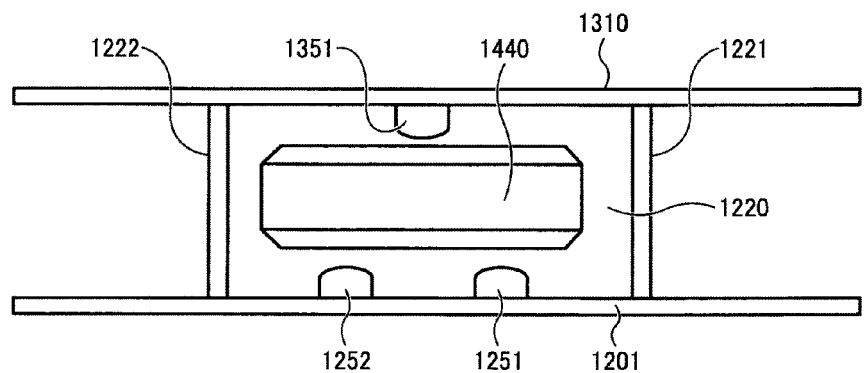
Figure 20C:
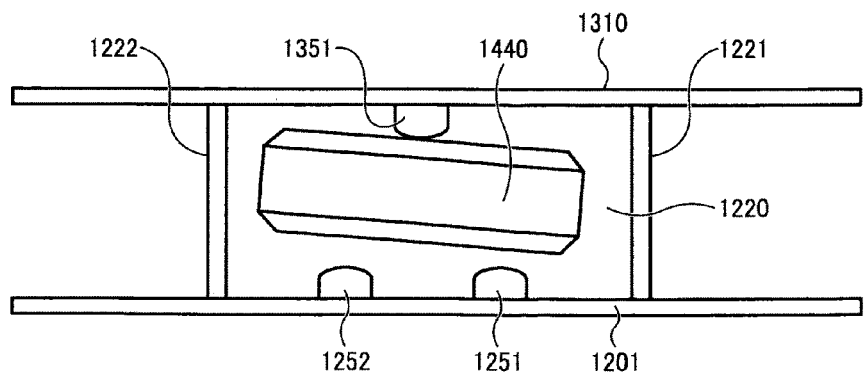

A relation between the weight 1440 and each of the weight guide rails 1251, 1252, and 1351 is described in detail below. FIGS. 20A to 20C are schematic diagrams for explaining a contact state of the weight 1440 and each of the weight guide rails 1251, 1252, and 1351. As described above, on the bottom plate member 1201 of the back case 2000 and the elliptical plate member 1310 of the front case 3000, the weight guide rails 1251, 1252, and 1351 are formed along corresponding one of the vertical path 1210, the upper-side horizontal paths 1220L, 1220R, and the lower-side horizontal paths 1230L, 1230R. Each of the weight guide rails 1251, 1252, and 1351 has a semispherical cross section on an end thereof to be in contact with the weight 1440 (see FIGS. 20A to 20C). In the second embodiment, the weight guide rails 1251 and 1252 are arranged on the bottom plate member 1201 as one side of each of the vertical path 1210, the upper-side horizontal paths 1220L, 1220R, and the lower-side horizontal paths 1230L, 1230R. Furthermore, the weight guide rail 1351 is arranged on the elliptical plate member 1310 as the other side of each of the vertical path 1210, the upper-side horizontal paths 1220L, 1220R, and the lower-side horizontal paths 1230L, 1230R, such that the weight guide rail 1351 is located in the middle between the weight guide rails 1251 and 1252. More particularly, regarding the upper-side horizontal path 1220, as shown in FIGS. 20A to 20C, the weight guide rail 1351 is arranged on the elliptical plate member 1310 and the weight guide rails 1251 and 1252 are arranged on the bottom plate member 1201. Thus, as shown in FIGS. 20A to 20C, the weight 1440 can smoothly move without being in contact with the inner wall surfaces or causing scoring even when the weight 1440 is at any positions or in any posture.

In the impact detecting apparatus 1000, the back case 2000 and the front case 3000 can be sealed with each other by the label 1500 having a surface coated with adhesive. The impact detecting apparatus 1000 can be re-used by removing the label 1500 for separating the back case 2000 and the front case 3000 from each other, and returning the weight 1440, the arm member 1420, and the arm member 1430 to the default positions. The back case 2000 and the front case 3000 can be sealed with each other by other joint members such as a screw.

Figure 21:
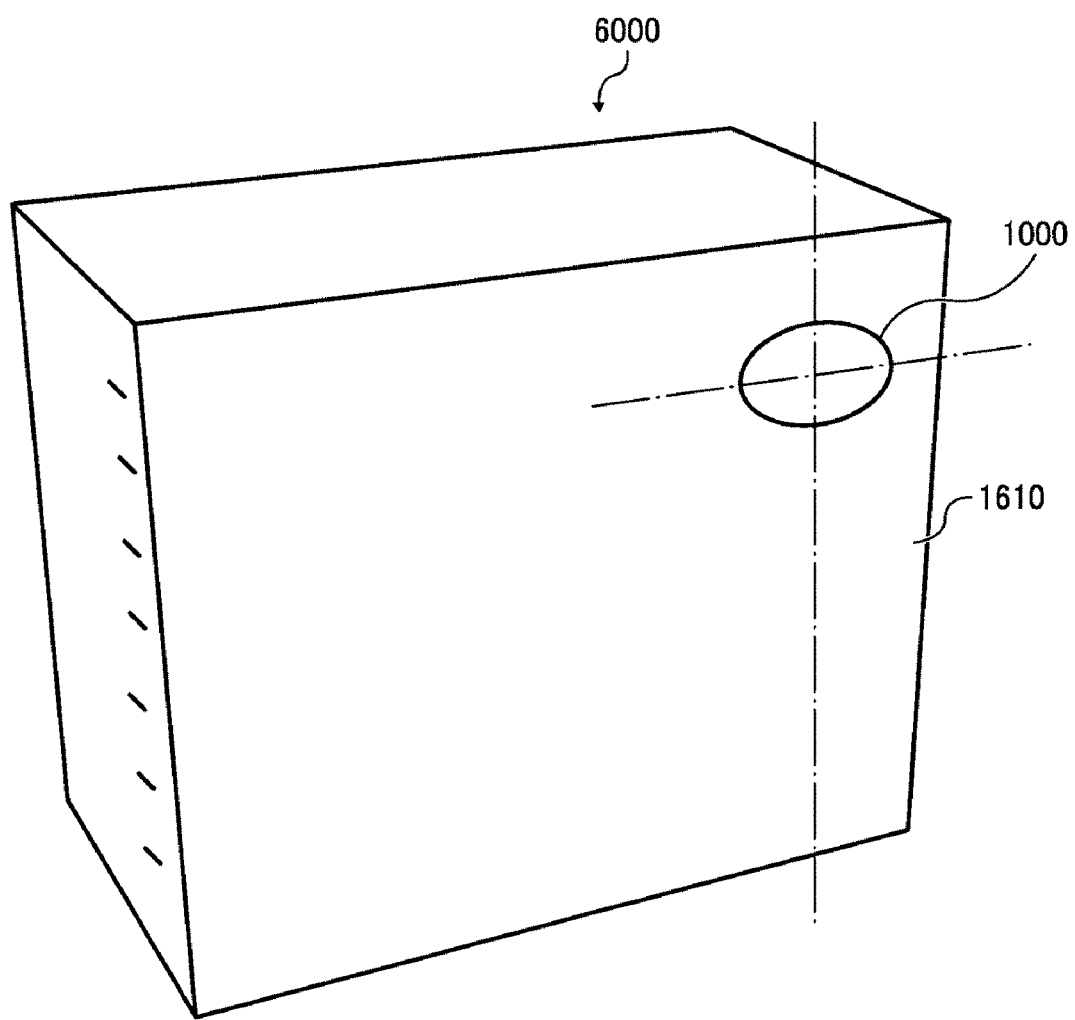
FIG. 21 is a schematic diagram of an example of usage of the impact detecting apparatus according to the second embodiment.

A usage of the impact detecting apparatus 1000 is described in detail below. FIG. 21 is a schematic diagram for explaining the usage of the impact detecting apparatus 1000. In the second embodiment, the impact detecting apparatus 1000 is attached to a side surface 1610 of a cardboard box 6000 with a double stick tape. The impact detecting apparatus 1000 can be fitted in the side surface 1610 of the cardboard box 6000 and fixed horizontally other than being attached to the cardboard box 6000. When the impact detecting apparatus 1000 is mounted on the cardboard box 6000, and if the cardboard box 6000 is subjected to the impact, there may be a case where a person fraudulently removes the impact detecting apparatus 1000 and returns the weight 1440 to the default positions by removing the back case 2000 (i.e., fraudulent manipulation). While the label 1500 can be used only as a seal member, it is preferable to form the adhesive face of the label 1500 with material that enables a part of adhesive on the adhesive face to be transferred onto the cardboard box 6000 when the label 1500 is removed, which makes it possible to detect whether the label 1500 is removed as a result of the fraudulent manipulation.

Operation of the impact detecting apparatus 1000 is described in detail below. When the impact detecting apparatus 1000 is subjected to the impact in the vertical direction, the weight 1440 moves, due to the external force, from the normal position N to the impact detection position S along the vertical path 1210 while pushing open the leaf springs 1410. When the impact detecting apparatus 1000 is subjected to the impact due to the tilt to the left or right, the weight 1440 moves from either the normal position N or the impact detection position S along corresponding one of the upper-side horizontal paths 1220L, 1220R, and the lower-side horizontal paths 1230L, 1230R. Accordingly, the weight 1440 moves corresponding one of the upper-side arm members 1420L, 1420R, and the lower-side arm members 1430L, 1430R, on which a display plate is mounted, so that corresponding one of the display portions 1421 and the display portions 1431 of the upper-side arm members 1420L, 1420R, and the lower-side arm members 1430L, 1430R is displayed in corresponding one of the upper-side tilt display holes 1320L, 1320R, and the lower-side tilt display holes 1330L, 1330R. Then, if the impact detecting apparatus 1000 is returned to normal posture, the weight 1440 returns to either the normal position N or the impact detection position S. When the weight 1440 returns to the normal position N, the impact detecting apparatus 1000 can detect another impact in the vertical direction and another tilt in a direction opposite to the previous tilt. When the weight 1440 is returned to the impact detection position S, the impact detecting apparatus 1000 can detect another tilt in a direction opposite to the previous tilt. Thus, the impact detecting apparatus 1000 can display a history of the various drop impact and the tilt, which is described in detail below.

FIG. 22A is a schematic diagram for explaining an example in which results of dropping and tilt of the impact detecting apparatus 1000 is displayed when the impact detecting apparatus 1000 drops and tilts to the left and right according to the second embodiment. FIG. 22B is a schematic diagram for explaining another example in which results of dropping and tilt of the impact detecting apparatus 1000 is displayed when the impact detecting apparatus 1000 drops and tilts to the left and right according to the second embodiment. In the example shown in FIG. 22A, the impact detecting apparatus 1000 tilts to the left, then drops, and then tilts to the right. In this case, the weight 1440 moves along the upper-side horizontal path 1220L and then moves the upper-side arm member 1420L, so that the display portion 1421 is displayed in the upper-side tilt display hole 1320L (see (i) of FIG. 22A). When the impact detecting apparatus 1000 returns to the normal state, the weight 1440 returns to the normal position N, so that the impact detecting apparatus 1000 can detect subsequent impact in the vertical direction and subsequent tilt. Then, when the impact detecting apparatus 1000 is subjected to the impact in the vertical direction, the weight 1440 moves from the normal position N to the impact detection position S along the vertical path 1210, so that the weight 1440 can be viewed from the impact display hole 1340. At this state, signs of the impact are displayed at two positions, i.e., in the upper-side tilt display hole 1320L and the impact display hole 1340 (see (ii) of FIG. 22A).

Then, when the impact detecting apparatus 1000 tilts to the right, the weight 1440 moves from the impact detection position S along the lower-side horizontal path 1230R, so that the weight 1440 moves the lower-side arm member 1430R. Accordingly, the display portion 1431 is displayed in the lower-side tilt display hole 1330R. As a result, when the impact detecting apparatus 1000 is returned to the normal state, signs of detection of the impact applied to the cardboard box 6000 are displayed at three position, i.e., in the upper-side tilt display hole 1320L, the lower-side tilt display hole 1330R, and the impact display hole 1340 (see (iii) of FIG. 22A).

In the example shown in FIG. 22B, the impact detecting apparatus 1000 drops, then tilts to the left, and then tilts to the right. In this case, the weight 1440 moves from the normal position N to the impact detection position S along the vertical path 1210, so that the weight 1440 is viewed from the impact display hole 1340 (see (i) of FIG. 22B). Then, when the impact detecting apparatus 1000 is returned to the normal state, the weight 1440 is placed at the impact detection position S, so that the impact detecting apparatus 1000 can detect its tilt (see (ii) of FIG. 22B).

When the impact detecting apparatus 1000 tilts to the left, the weight 1440 moves along the lower-side horizontal path 1230L to move the lower-side arm member 1430L, so that the display portion 1431 is displayed in the lower-side tilt display hole 1330L (see (ii) of FIG. 22B). Then, when the impact detecting apparatus 1000 tilts to the right, the weight 1440 moves along the lower-side arm member 1430R to move the lower-side arm member 1430R, so that the display portion 1431 is displayed in the lower-side tilt display hole 1330R. Thus, when the impact detecting apparatus 1000 is returned to the normal state, signs of the impact and the tilt are displayed at three positions, i.e., in the lower-side tilt display hole 1330L, the lower-side tilt display hole 1330R, and the impact display hole 1340 (see (iii) of FIG. 22B).

According to one aspect of the present invention, it is possible to detect whether an object has been subjected to impact or tilting in a plurality of different directions, such as dropping in the vertical direction or tilting to the left or right, because of application of external force while the object is moved or shipped. It is also possible to display and save results of the impact and the tilt applied to the object.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An impact detecting apparatus configured to be attached to an object, the impact detecting apparatus comprising:
a drop-impact display unit configured to display a direction of drop impact when the object is dropped;
a tilt display unit configured to display a direction of tilting when the object is tilted, wherein
the drop-impact display unit and the tilt display unit displays the direction of drop-impact and the direction of tilting at the same time; and
a weight configured to move when the object is subjected to at least one of the drop-impact and the tilting;
at least one predefined path configured to guide the weight along the at least one predefined path, wherein movement of the weight along the at least one predefined path is used to indicate a direction of the at least one of the drop-impact and the tilting, wherein, the at least one predefined path includes a vertical path along which the weight drops to indicate the direction of the drop impact; and
the at least one predefined path includes a tilt direction path along which the weight rolls to indicate the direction of the tilting.

2. A package device in which an object is accommodated, the package device comprising the impact detecting apparatus according to claim 1 on at least one surface thereof.

3. An Impact detecting apparatus configured to be attached to an object, the impact detecting apparatus comprising:
a drop-impact display unit configured to display a direction of drop impact when the object is dropped;
a tilt display unit configured to display a direction of tilting when the object is tilted;
at least one weight configured to move when the object is subjected to at least one of the drop impact and the tilting or both;
a vertical path configured to release at least one of the weights placed on a normal position to guide at least one of the weights to an impact detection position below the normal position when the object is subjected to the drop impact; and
tilt direction paths arranged across the normal position and on which at least one of the weights moves when the object is subjected to tilting, wherein
the drop-impact display unit displays a sign of occurrence of the drop impact when at least one of the weights moves along the vertical path, and
the tilt display unit displays a sign of occurrence of the tilting when at least one of the weights moves along the tilt direction paths.

4. The impact detecting apparatus according to claim 3, further comprising guide rails along the vertical path and the tilt direction paths, respectively, such that the guide rails are inwardly protruded from each of a back case and a front case of the impact detecting apparatus so that each of the guide rails are in contact with the weights.

5. The impact detecting apparatus according to claim 4, wherein the guide rail has a semispherical cross section, and the guide rails are arranged in a double-line manner on one of the back case and the front case and a single-line manner on other one of the back case and the front case.

6. The impact detecting apparatus according to claim 3, further comprising two first holding members arranged on both sides of the vertical path, each of the first holding members being made of a plate-shaped elastic member, extended for a predetermined length from corresponding one of first supporting members arranged on corresponding one of the both sides of the vertical path, inclined downward from corresponding one of the first supporting members, and arranged such that an end of one of the first holding members being separated from an end of other one of the first holding members at a predetermined interval across the vertical path so that the first holding members as a pair can support at least one of the weights at the ends thereof and release at least one of the weights in a drop direction of at least one of the weights when at least one of the weights receives an impact of a predetermined level or higher in an impact application direction.

7. The impact detecting apparatus according to claim 6, wherein an end of the first of the pair of first holding member is placed at a position inward with respect to a contact point between at least one of the weights and the first of the pair of first holding member, and an end of the second of the pair of first holding member is placed at a position inward with respect to a contact point between at least one of the weights and the second of the pair of first holding member.

8. The impact detecting apparatus according to claim 3, wherein when at least one of the weights is placed at the normal position and if the object tilts, at least one of the weights moves from the normal position, and then if the object returns to normal posture, at least one of the weights moves back to the normal position.

9. The impact detecting apparatus according to claim 3, wherein
the vertical path and the tilt direction paths are accommodated in a case formed of a back case and a front case configured to cover a front surface of the back case,
the drop-impact display unit includes a see-through window formed as an opening on the front case at a position opposed to the impact detection position so that at least one of the weights at the impact detection position can be viewed from outside of the impact detecting apparatus, and
the tilt display unit includes a plurality of through holes formed as openings on the front case at a position opposed to a display plate member configured to be moved by being in contact with at least one of the weights when at least one of the weights moves to one of the tilt direction paths so that the display plate member can be viewed from outside of the impact detecting apparatus.

10. The impact detecting apparatus according to claim 9, wherein the display plate member is mounted on an arm member configured to be rotatably mounted on the case so that the display plate member can be viewed through one of the through holes when at least one of the weights comes into contact with the arm member.

11. A package device in which an object is accommodated, the package device comprising the impact detecting apparatus according to claim 3 on at least one surface thereof.

12. An impact detecting apparatus configured to be attached to an object, the impact detecting apparatus comprising: a drop-impact display unit configured to display a direction of drop impact when the object is dropped; a tilt display unit configured to display a direction of tilting when the object is tiled; at least one weight configured to be placed in a case, configured to move by inertial force thereof along a moving direction opposite to a direction of an impact applied to the case, and has a circular profile; and two first holding members arranged in the case on both sides of a transfer path, the transfer path being arranged along the moving direction, each of the first holding members being made of plate-shaped elastic material, extending for a predetermined length from corresponding one of first supporting members arranged on corresponding one of the both sides of the transfer path, inclined downward from corresponding one of the first supporting members, and arranged such that an end of one of the first holding members at a predetermined interval across the transfer path so that the first holding members as a pair can support at least one of the weights at the ends thereof and release at least one of the weights in the moving direction of at least one of the weights when the case receives an impact of a predetermined level or higher in an impact application direction.

13. The impact detecting apparatus according to claim 12, further comprising two second holding members arranged in the case on both sides of the transfer path and below the first holding members such that each of the second holding members are separated from corresponding one of the first holding members at an interval larger than a diameter of at least one of the weights, each of the second holding members being made of plate-shaped elastic material, extended for a predetermined length from corresponding one of second supporting members arranged on corresponding one of the both sides of the transfer path, inclined downward from corresponding one of the second supporting members, and arranged such that an end of one of the second holding members being separated from an end of other one of the second holding members at a predetermined interval across the transfer path so that the second holding members as a pair can support at least one of the weights at the ends thereof and release at least one of the weights in the moving direction of at least one of the weights when the case receives an impact of a predetermined level or higher in the impact application direction, wherein other end of each of the first holding members is connect to other end of corresponding one of the second holding members via a connecting unit so that a pair of one of the first holding members and corresponding one of the second holding members functions as a first plate member and a pair of other one of the first holding members and corresponding other one of the second holding members functions as a second plate member, lengths from the first supporting members to the ends of the first holding members are substantially equal to lengths from the second supporting members to the ends of the second holding members, the interval between the ends of the first holding members is substantially equal to the interval between the ends of the second holding members.

14. The impact detecting apparatus according to claim 13, wherein the case includes weight holding members at positions outside the first holding members, each of the weight holding members being configured to hold at least one of the weights when at least one of the weights moves toward each of the weight holding members, and each of the first holding members functions as a guide member configured to guide at least one of the weights to corresponding one of the weight holding members when the case tilts.

15. The impact detecting apparatus according to claim 12, wherein the case includes weight holding members at positions outside the first holding members, each of the weight holding members being configured to hold at least one of the weights when at least one of the weights moves toward each of the weight holding members, and each of the first holding members functions as a guide member configured to guide at least one of the weights to corresponding one of the weight holding members when the case tilts.

16. The impact detecting apparatus according to claim 13, wherein one of the second supporting members is brought into contact with a bottom surface of the second holding member of the first plate member and other one of the second supporting members is brought into contact with a bottom surface of the second holding members of the second plate member so that each of the second supporting members functions as a fulcrum of corresponding one of the second holding members to prevent corresponding one of the first plate member and the second plate member from rotating.

17. The impact detecting apparatus according to claim 12, wherein an end of the first of the pair of first holding member is placed at a position inward with respect to a contact point between at least one of the weights and the first of the pair of first holding member, and an end of the second of the pair of first holding member is placed at a position inward with respect to a contact point between at least one of the weights and the second of the pair of first holding member.

18. A package device in which an object is accommodated, the package device comprising the impact detecting apparatus according to claim 12 on at least one surface thereof.

* * * * *